US007305404B2

(12) United States Patent
Owens et al.

(10) Patent No.: US 7,305,404 B2
(45) Date of Patent: Dec. 4, 2007

(54) DATA STRUCTURE AND MANAGEMENT SYSTEM FOR A SUPERSET OF RELATIONAL DATABASES

(75) Inventors: Timothy C. Owens, New Freedom, PA (US); Bruce E. Harrison, Baltimore, MD (US)

(73) Assignee: United Parcel Service of America, Inc., Atlanta, GA (US)

( * ) Notice: Subject to any disclaimer, the term of this patent is extended or adjusted under 35 U.S.C. 154(b) by 492 days.

(21) Appl. No.: 10/690,322

(22) Filed: Oct. 21, 2003

(65) Prior Publication Data

US 2005/0086256 A1 Apr. 21, 2005

(51) Int. Cl.
*G06F 17/30* (2006.01)
(52) U.S. Cl. .............................. 707/101; 707/3; 707/10
(58) Field of Classification Search ..... 707/100–104.1, 707/10, 201
See application file for complete search history.

(56) References Cited

U.S. PATENT DOCUMENTS

| | | | |
|---|---|---|---|
| 5,387,783 A | | 2/1995 | Mihm et al. |
| 5,422,821 A | | 6/1995 | Allen et al. |
| 5,452,203 A | | 9/1995 | Moore |
| 5,710,917 A | * | 1/1998 | Musa et al. ................. 707/201 |
| 5,754,671 A | * | 5/1998 | Higgins et al. ............. 382/101 |
| 5,758,574 A | * | 6/1998 | Bernardo et al. ............. 101/2 |
| 5,905,666 A | | 5/1999 | Hoffman et al. |
| 5,953,427 A | | 9/1999 | Cordery et al. |
| 5,963,642 A | * | 10/1999 | Goldstein ................... 713/193 |
| 5,978,792 A | | 11/1999 | Bhargava et al. |
| 6,131,101 A | | 10/2000 | Maitino et al. |
| 6,205,447 B1 | | 3/2001 | Malloy |
| 6,253,219 B1 | | 6/2001 | Gardner et al. |
| 6,438,579 B1 | * | 8/2002 | Hosken ...................... 709/203 |

(Continued)

FOREIGN PATENT DOCUMENTS

EP    1197 885 A2    12/2001

(Continued)

OTHER PUBLICATIONS

Haderle, D.J., et al., "IBM Database 2 Overview," IBM Systems Journal, IBM Corporation; Armonk, New York; vol. 23, No. 2 (1984), pp. 112-125.

(Continued)

*Primary Examiner*—Cam Linh Nguyen
(74) *Attorney, Agent, or Firm*—Alston & Bird LLP

(57) ABSTRACT

A data structure, database management system, and methods of validating data are disclosed. A data structure is described that includes a superset of interconnected relational databases containing multiple tables having a common data structure. The tables may be stored as a sparse matrix linked list. A method is disclosed for ordering records in hierarchical order, in a series of levels from general to specific. An example use with address databases is described, including a method for converting an input address having a subject representation into an output address having a preferred representation. Preferred artifacts may be marked with a token. Alias tables may be included. This Abstract is provided to comply with the rules, which require an abstract to quickly inform a searcher or other reader about the subject matter of the application. This Abstract is submitted with the understanding that it will not be used to interpret or limit the scope or meaning of the claims.

20 Claims, 11 Drawing Sheets

U.S. PATENT DOCUMENTS

| | | |
|---|---|---|
| 6,439,783 B1 | 8/2002 | Antoshenkov |
| 6,456,998 B1 * | 9/2002 | Bui et al. .................. 707/2 |
| 6,457,012 B1 | 9/2002 | Jatkowski |
| 6,487,549 B1 | 11/2002 | Amundsen |
| 6,502,089 B1 | 12/2002 | Amundsen et al. |
| 6,507,835 B1 | 1/2003 | Amundsen et al. |
| 6,557,000 B1 | 4/2003 | Seestrom et al. |
| 6,564,204 B1 | 5/2003 | Amundsen et al. |
| 6,575,376 B2 | 6/2003 | Yu |
| 6,647,385 B2 | 11/2003 | Seestrom et al. |
| 6,681,391 B1 * | 1/2004 | Marino et al. ............ 717/175 |
| 6,826,548 B2 | 11/2004 | Hungerpiller et al. |
| 6,931,418 B1 * | 8/2005 | Barnes ................ 707/103 R |
| 2001/0043599 A1 | 11/2001 | Redmond |
| 2001/0054031 A1 | 12/2001 | Lee et al. |
| 2002/0065815 A1 * | 5/2002 | Layden ...................... 707/3 |
| 2002/0078024 A1 | 6/2002 | Bellamy et al. |
| 2002/0124015 A1 | 9/2002 | Cardno et al. |
| 2002/0153409 A1 | 10/2002 | Yu |
| 2002/0174148 A1 | 11/2002 | Seidman |
| 2003/0074213 A1 | 4/2003 | Murakami et al. |
| 2004/0215588 A1 | 10/2004 | Cornelius |

FOREIGN PATENT DOCUMENTS

| | | |
|---|---|---|
| JP | 408323299 A | 12/1996 |
| WO | WO-96/34354 | 10/1996 |
| WO | WO 96/38800 A1 | 12/1996 |

OTHER PUBLICATIONS

Pooch, U.W., et al., "A Survey of Indexing Techniques for Sparse Matrices;" Computing Surveys; vol. 5, No. 2 (Jun. 1973); pp. 109-122.

International Search Report for International Application No. PCT/US 03/33349.

U.S. Appl. No. 60/379,034; filed May 8, 2002.

U.S. Appl. No. 11/342,041; filed Jan. 27, 2006.

* cited by examiner

| FIELDS (row i, column j) | Column 1 | Column 2 | Column 3 |
|---|---|---|---|
| Row 1 | Field (1,1) | Field (1,2) | Field (1,3) |
| Row 2 | Field (2,1) | Field (2,2) | Field (2,3) |
| Row 3 | Field (3,1) | Field (3,2) | Field (3,3) |
| Row 4 | Field (4,1) | Field (4,2) | Field (4,3) |

Record 42, Field 44, Table 40

FIG. 5

| VALUES | Column 1 | Column 2 | Column 3 |
|---|---|---|---|
| Row 1 | 0 | Smith | 0 |
| Row 2 | 0 | 0 | 0 |
| Row 3 | 27 | 0 | 0 |
| Row 4 | 19 | 0 | 260B |

Value 46

FIG. 6

Postal Preferred Table 141.1

| Node | Zip | Token | Street | Type | Lo | Hi | Odd/Even | Consignee | See | Lo | Hi | +4 |
|---|---|---|---|---|---|---|---|---|---|---|---|---|
| 1 | 20001 | T1 | FIRST | ST | 440 | 498 | E | | | | | 2023 |
| 2 | 20001 | T2 | FIRST | ST | 440 | 440 | E | | | | | 2028 |
| 3 | 20001 | T3 | FIRST | ST | 440 | 440 | E | | STE | 100 | 400 | 2028 |
| 4 | 20001 | T4 | FIRST | ST | 440 | 440 | E | | STE | 430C | 430C | 2028 |
| 5 | 20001 | T5 | FIRST | ST | 440 | 440 | E | | STE | 500 | 600 | 2028 |
| 6 | 20001 | T6 | FIRST | ST | 440 | 440 | E | APC | STE | 600 | 600 | 2017 |
| 7 | 20001 | T6 | FIRST | ST | 440 | 440 | E | AM POLLING CMTE | STE | 600 | 600 | 2017 |
| 8 | 20001 | T7 | FIRST | ST | 440 | 440 | E | NORCO | STE | 500 | 500 | 2030 |
| 9 | 20001 | T⁀ | | | | | | | | | | |
| 12 | 20001 | T11 | FIRST | ST | 440 | 440 | E | | STE | 430A | 430B | 2042 |
| 13 | 20001 | T12 | FIRST | ST | 440 | 440 | E | | STE | 450 | 450 | 2042 |
| | 20001 | | FIRST | ST | 440 | 440 | E | | STE | 800 | 800 | 2043 |

FIG. 9

| NODE | TOKEN | LEVEL | Zip | Street | Type | Hi Lo | Hi | Odd/Even | Consignee | See | Lo | Hi | +4 |
|---|---|---|---|---|---|---|---|---|---|---|---|---|---|
| 1 | T1 | LEVEL 1 | 20001 | FIRST | ST | 440 | 498 | E | | | | | 2023 |
| 2 | T2 | LEVEL 2 | 20001 | FIRST | ST | 440 | 440 | E | | | | | 2028 |
| 3 | T3 | LEVEL 3 | 20001 | FIRST | ST | 440 | 440 | E | | | | | 2028 |
| 10 | T9 | LEVEL 4 | 20001 | FIRST | ST | 440 | 440 | E | ACME CORP | STE | 100 | 400 | 2028 |
| | | | | | | | | | | STE | 310 | 310 | 2085 |
| 11 | T10 | LEVEL 3 | 20001 | FIRST | ST | 440 | 440 | E | | STE | 430A | 430B | 2042 |
| 4 | T4 | LEVEL 3 | 20001 | FIRST | ST | 440 | 440 | E | | STE | 430C | 430C | 2028 |
| 12 | T11 | LEVEL 3 | 20001 | FIRST | ST | 440 | 440 | E | | STE | 450 | 450 | 2042 |
| 5 | T5 | LEVEL 3 | 20001 | FIRST | ST | 440 | 440 | E | NORCO | STE | 500 | 600 | 2028 |
| 8 | T7 | LEVEL 4 | 20001 | FIRST | ST | 440 | 440 | E | | STE | 500 | 500 | 2030 |
| 6 | T6 | LEVEL 4 | 20001 | FIRST | ST | 440 | 440 | E | APC | STE | 600 | 600 | 2017 |
| 7 | T6 | LEVEL 4 | 20001 | FIRST | ST | 440 | 440 | E | AM POLLING CMTE | STE | 600 | 600 | 2017 |
| 13 | T12 | LEVEL 3 | 20001 | FIRST | ST | 440 | 440 | E | | STE | 800 | 800 | 2043 |
| 9 | T8 | LEVEL 4 | 20001 | FIRST | ST | 440 | 440 | E | PLEXTON | STE | 800 | 800 | 2080 |

FIG. 11

Street Alias Table 142

| ZIP | Token | Street Name | Street Type | Alias Street Name | Alias Street Type |
|---|---|---|---|---|---|
| 10015 | T4081 | 6TH | AVE | AVENUE OF THE AMERICAS | |
| 10015 | T4081p | AVENUE OF THE AMERICAS | | 6TH | AVE |
| 10015 | T4081 | AVENUE OF AMERICAS | | 6TH | AVE |
| 10015 | T4081 | AVENUE OF AMERICAS | | AVENUE OF THE AMERICAS | |
| 10015 | T4081 | 6TH | AVE | SIXTH | AVE |
| 10015 | T4081 | SIXTH | AVE | 6TH | AVE |

FIG. 13

DATA STRUCTURE AND MANAGEMENT SYSTEM FOR A SUPERSET OF RELATIONAL DATABASES

BACKGROUND

1. Technical Field

The following disclosure relates in general to relational database management systems and more particularly, to a method and apparatus for processing hierarchical data across multiple relational databases using sparse matrix. linked lists in a computer network environment.

2. Description of Related Art

The database has been a staple of computing since the beginning of the digital era. A database refers generally to one or more large, structured sets of persistent data, usually associated with a software system to create, update, and query the data. In a database, each data value is stored in a field; a set of fields together form a record; and a group of records may be stored together in a file.

The first databases were flat; meaning all the data was stored in a single line of text called a delimited file. In a delimited file, each field is separated by a special character such as a comma. Each record is separated by a different character, such as a caret (^) or a tab character. A simple delimited file may look like this:

Last,First,Age^Doe,John,26^Smith,Jane,43^Jones,David,34

Each field may be assigned a name or category called an attribute. In the sample file above, the attributes are Last, First, and Age. The attribute indicates the type of data to be stored in each field. For large amounts of data, the delimited text file can grow very long. Accessing specific data generally requires searching sequentially through the entire list. As the capacity of computers and databases increased, the need for more efficient access and faster searching techniques led to the development of new data structures.

The relational database model was described in the early 1970s. In a relational database, the data is stored in a table. A table organizes the data into rows and columns, providing a specific location (such as row x, column y) for each field. Each row contains a single record. The columns are arranged in order, by attribute, so all the fields in each column contain the same type of data. The delimited file above may be represented in table format like this:

| Last  | First | Age |
|-------|-------|-----|
| Doe   | John  | 26  |
| Smith | Jane  | 43  |
| Jones | David | 34  |

The set of attributes or column headings is sometimes referred to as the schema of a table. The table above, for example, may be described as a table having the schema (Last, First, Age).

The table format for a database file makes searching and accessing data faster and more efficient. The records (rows) can also be sorted into a new order, based on any one or more of the columns (fields). Sorting is often used to order the records such that the most desired data appears earlier in the file, thereby making searching faster.

As computing speed and capacity increased, database tables were able to store larger amounts of data. Additional records (rows) may be added to describe additional instances. Additional attributes (columns) may be added to accommodate more types of data about each instance. As the number of fields increases, the task of changing the table structure (adding or deleting rows and columns) becomes more complex and increases the likelihood of error. Also, for large tables, the task of sorting the data based on one or more columns becomes more complex and time-consuming. Adding diverse types of data in a single, large, two-dimensional table eventually creates problems such as redundancy, inconsistency, increased storage requirements, and slower sorting and computing speeds.

Relational Databases with Multiple Tables. To accommodate diverse types of fields containing related data, a relational database model may include multiple tables. Multiple tables containing related data may be linked together using a key field. A key field contains a unique identifier for each record (or row of data). The key field can contain actual data, such as a part number or a Social Security Number, as long as it is unique to that record. This is sometimes called a logical key. The key field may also be a surrogate key, such as a record number, which is a unique identifier not related to the actual data. Also, a key can be defined using a single field or a set of fields. A simple key is based on a single field, whereas a composite key is based on multiple fields.

In a relational database, related data may be stored in multiple tables. A key field called a "primary key" acts as a unique reference point for finding a particular record in a table. For example, the attributes (or column headings) in a sample "Table A" may be (Name, Age, Social Security Number, Employee Number). The primary key for Table A is the Social Security Number field.

In a relational database where data is stored in multiple tables, another key field called a "foreign key" is used as a reference point for connecting the tables. For example, consider another sample table: "Table B" having the schema (Employee Number, Department Name, Date of Hire, Salary). The primary key for Table B is the unique Employee Number field. Referring back to the attributes in Table A, the foreign key for Table A is the Employee Number field, because it links the records in Table A to the records in Table B. This relationship between tables can be illustrated using Entity Relationship Diagrams, where each table contains the data for a unique entity or category, such as "Age" or "Department."

| Relational Database | |
|---|---|
| Table A (Age) | Table B (Dept) |
| +Name | +EmployeeNr |
| +Age | +DepartmentName |
| +SSN | +HireDate |
| +EmployeeNr | +Salary |

The shaded "EmployeeNr" field is common to both tables, and it provides a link between the data in the two Tables. The "EmployeeNr" field is the foreign key in Table A, but it is the primary key in Table B.

Table A and Table B need not include the same number of records. For example, the records in Table A may include the names, ages, Social Security Numbers, and Employee Numbers of everyone in an organization; and the records in Table B may be limited to only those in a particular department or division.

By including discrete sets of data in separate tables, a relational database can access selected tables for a variety of purposes. A single relational database may include any number of tables, from just a few to several thousand tables.

Query language allows users to interact with a database and analyze the data in the tables. A query is a collection of instructions used to extract a set of data from a database. Queries do not change the information in the tables; they merely display the information to the user. The result of a query is sometimes called a view.

The best known query language is Structured Query Language (SQL), pronounced "sequel." SQL is the standard language for database interoperability. Queries are probably the most frequently used aspect of SQL, but SQL commands may also be used as a programming tool, to create and maintain a database.

Database Management Systems. A database management system (sometimes abbreviated DBMS) refers generally to an interface and one or computer software programs specifically designed to manage and manipulate the information in a database. The DBMS may include a complex suite of software programs that control the organization, storage, and retrieval of data, as well as the security and integrity of the database. The DBMS may also include an interface, for accepting requests for data from external applications.

An interface is a computer program designed to provide an operative connection or interface between a user and an application, such as a DBMS. An interface for a DBMS may provide a series of commands that allow a user to create, read, update, and delete the data values stored in the database tables. These functions (create, read, update, delete) are sometimes referred using the acronym CRUD, so an interface with those commands may be called a CRUD interface. A database interface that includes a query function may be called a CRUDQ interface.

A COM-based interface refers to software that is based upon the Component Object Model. Component Object Model is an open software architecture developed by Digital Equipment Corporation and Microsoft which allows for interoperability between various components of a database system.

In a relational database including multiple tables, the database management system (DBMS) is generally responsible for maintaining all the links between and among key fields in the various tables. This is referred to as maintaining the "referential integrity" of the database.

Maintaining referential integrity is often a challenge in a relational database that includes a very large number of tables. The linked nature of relational database tables has many advantages, but it may also allow an error to propagate across tables and throughout the entire database, especially when records or key fields are changed or deleted. The potential for error is compounded for systems where a variety of users have access to the database through a CRUD interface.

In a computer network environment, a large database may be housed on an central server, with many users or subscribers accessing the data from remote locations using a communication link. The speed of access is often limited by the type and capacity of the communication link. Distributing a duplicate of the entire database to the remote location is generally impractical, especially for applications where the data must be current to be useful. Also, a large database stored locally would create a substantial burden on local users because remote systems are typically smaller than central servers. Storing a-large database on a local system without sufficient capacity often causes an unacceptable increase in computing time. The cost of upgrading all the hardware for every remote location may be too expensive, especially for very large user networks.

Updating the data in large relational databases can be technically challenging and time-consuming, especially in a network environment where the data must be updated frequently. Transmitting an updated copy of the entire database is often impractical and cost-prohibitive. Also, the cost and delay of distribution may present a barrier to the frequency of updates.

Thus, there is a need in the art for an improved database management system capable of maintaining and protecting a large volume of data, distributing frequent updates in a cost-effective manner, and processing requests for data quickly and efficiently at all locations within a network.

Address Databases. The United States includes more than 145 million deliverable addresses. A database containing information about all those street addresses is an example of a very large database. Address databases are available from private sources or from government sources, such as the U.S. Postal Service (USPS).

The USPS offers a variety of address databases to the public, including a City-State file, a Five-Digit ZIP file, and a ZIP+4 file. The City-State file is a comprehensive list of ZIP codes with corresponding city and county names. The Five-Digit ZIP file, when used in conjunction with the City-State file, allows users to validate existing five-digit ZIP code assignments. The ZIP+4 file provides a comprehensive list of ZIP+4 codes.

The Delivery Sequence File (DSF) is a computerized database developed by the USPS which includes a complete, standardized address, stored in a discrete record, for every delivery point serviced by the USPS. Each separate record contains the street address, the ZIP+4 code, the carrier route code, the delivery sequence number (walk sequence number), a delivery type code, and a seasonal delivery indicator. DSF includes sufficient data to accomplish address validation and standardization. DSF is offered to licensees who develop certified address hygiene software. The USPS recently developed a new Delivery Point Validation (DPV) database to replace DSF. The DPV database is available in its basic format or in its enhanced format, called $DSF^2$, which includes additional address attributes.

Address Standardization. The need to standardize mailing addresses is a relatively modern development. A tremendous increase in the volume of mail, mostly business mail, caused a serious crisis for the postal service in the early 1960s. The computer was the single greatest force behind the dramatic increase in mail volume. The computer allowed businesses to automate a variety of mailing functions, but the postal service was not prepared for the explosion in mail volume. In response to the crisis, the Zone Improvement Plan (ZIP) was instituted. By July 1963, a five-digit ZIP code had been assigned to every deliverable address in the United States. The ZIP code marked the beginning of the modem era of address standardization.

Two decades later, the ZIP+4 code was introduced, adding a hyphen and four more digits to the ZIP code. Today, mail is often sorted using multi-line optical character readers that scan the entire address, print an eleven-digit Delivery Point Bar Code (DPBC) on the envelope, and sort the mail into trays in the established walk sequence along each delivery route.

Address standardization transforms a given address into the best format for meeting governmental guidelines, such as those established by the USPS. Standardization affects all components of the delivery address, including the format, font, spacing, typeface, punctuation, and ZIP code or DPBC. For example, a non-standard address such as:

John Doe
123 East Main Street, N.W.
25 Oakland Center, Suite A-4
Atlanta, Ga. 30030 may look quite different after standardization:

JOHN DOE
123 E MAIN ST NW STE A4
DECATUR GA 30030-1549

|..||.||...||....||.||....||.|.|.||.|...||.||.||..|

An address can be subdivided or parsed into its components, which are sometimes called artifacts. For example, the individual artifacts in the address above include a Resident or Consignee (John Doe), a Number (123), a Pre-directional (E), a Primary Name (Main), a Type (St), a Post-directional (NW), a Secondary Name (STE), a Secondary Number (A4), and a city, state and ZIP+4 code (Decatur Ga. 30030-1549). Dividing an address into its individual artifacts is useful in many contexts, including postal sorting and address validation.

Address Validation. Whereas standardization refers to the way an address is formatted, the process of address validation confirms whether a given address is valid and current. Address databases, from private or government sources, are often used to validate addresses. For example, the USPS databases discussed above may be used for comparison purposes to validate addresses.

In addition to governmental postal services, private businesses such as commercial parcel carriers often develop and maintain address databases for storing unique and valuable customer information. Private databases, developed independent of government postal service data, may represent the next generation in addressing precision and data storage. In the future, a wider variety of governmental and private address databases will be available.

USPS address databases are regularly updated with new data. In addition to regular, periodic updates, the USPS has also developed a number of correction databases including NCOA and LACS. The National Change of Address (NCOA) database contains address change records. The Locatable Address Conversion System (LACS) contains new addresses for regions that have undergone a conversion from rural route to city-type addresses.

Because of growth and changes in population, address databases generally require frequent updating. As with any other large database, updating the data in very large address databases is often technically challenging and time-consuming. Thus, in the context of address databases, there is a need in the art for an improved database management system capable of maintaining and protecting large quantities of address data, distributing frequent updates to users or subscribers in a cost-effective manner, and processing requests for address data quickly and efficiently.

SUMMARY

The following summary is not an extensive overview and is not intended to identify key or critical elements of the apparatuses, methods, systems, processes, and the like, or to delineate the scope of such elements. This Summary provides a conceptual introduction in a simplified form as a prelude to the more-detailed description that follows.

Certain illustrative example apparatuses, methods, systems, processes, and the like, are described herein in connection with the following description and the accompanying drawing figures. These examples represent but a few of the various ways in which the principles supporting the apparatuses, methods, systems, processes, and the like, may be employed and thus are intended to include equivalents. Other advantaged and novel features may become apparent from the detailed description which follows, when considered in conjunction with the drawing figures.

In view of the broad teachings of the present invention, a data structure, database management system, processing apparatus, and related methods are provided having an advantageous construction. The example apparatuses, methods, and systems described herein facilitate the prompt and efficient validation of input data presented in a subjective representation and produces output data having a preferred representation.

In one aspect of the present invention, a data structure may include a superset that includes a primary database operatively connected to one or more secondary databases, wherein each of the primary and one or more secondary databases comprises a first table operatively linked to one or more other tables, and each of the first and one or more other tables-share a common data structure. The databases may be relational databases. The common data structure may include a sparse matrix linked list. The common data structure may also include data records arranged in hierarchical order, in a series of levels from general to specific, based upon the data.

In the data structure, the primary database may include source tables, a first secondary database may include alias tables, a second secondary database may include standardization tables, and a third secondary database may be configured to accept and store input data. The source tables may include data records obtained from a public or private source, the alias tables may include one or more equivalent representations of a record, and the standardization tables may include one or more standardized representations of a record. In another aspect of the data structure, the source tables may include address records obtained from a government postal service and a commercial source.

Within the data structure, the first table may include preferred records, a first other table may include primary alias records, and a second other table may include secondary alias records. The preferred records may include one or more preferred representations, the primary alias records may include one or more equivalent representations of a primary artifact, and the secondary alias records may include one or more equivalent representations of a secondary artifact. In a related aspect, the preferred records may include one or more preferred representations of an address.

In another aspect of the present invention, a method is provided for preparing data for optimal searching, the data being stored in one or more databases comprising a plurality of linked tables of records. The method may include arranging the records in each of the tables in hierarchical order, in a series of levels from general to specific, based upon the data; and transforming each of the tables into one or more sparse matrix linked list tables. When the databases exist in a server-client network environment, the method may also include distributing a duplicate of the one or more sparse matrix linked list tables from a server to one or more clients. The databases may bet relational databases interconnected to form a data superset. In one aspect, the data may include address artifacts.

In another aspect of the present invention, an apparatus is provided for preparing data for optimal searching, the being data stored in one or more databases comprising a plurality of linked tables of records. The apparatus may include a central processing unit, a memory, a basic input/output system, and program storage containing a program module executable by the central processing unit. The program module may include means for arranging the records in each of the tables in hierarchical order, in a series of levels from general to specific, based upon the data; and means for transforming each of the tables into one or more sparse matrix linked list tables. The apparatus may also include one or more clients remote from the central processing unit. The program module may also include means for distributing a duplicate of the one or more sparse matrix linked list tables from a server to one or more clients.

In another aspect of the present invention, a method is provided for using a database of linked tables to convert a subjective representation into a preferred representation. The method may include capturing the subjective representation and storing it in a first one of the linked tables; storing source data in a second one of the linked tables; locating one or more candidate representations from among the source data by comparing the subjective representation to the source data; selecting a preferred representation from among the one or more candidate representations, the preferred representation having the closest resemblance to the subjective representation; and releasing the preferred representation.

The method may also include reviewing the source data to identify one or more select records containing preferred data; and adding a preferred token to the one or more select records.

The step of selecting a preferred representation may include identifying a preferred token associated with one of the one or more candidate representations.

The step of locating one or more candidate representations may also include: (a) parsing the subjective representation into one or more discrete artifacts; (b) selecting one of the one or more discrete artifacts: (1) locating one or more candidate artifacts from among the source data by comparing the one discrete artifact to the source data; (2) selecting a preferred artifact from among the one or more candidate artifacts, the preferred artifact having the closest resemblance to the one discrete artifact; (3) storing the preferred artifact; (c) repeating step (b) for each of the one or more discrete artifacts; and (d) combining the preferred artifacts to form a preferred representation.

The step of locating one or more candidate representations may also include storing alias data in a third one of the linked tables; reviewing the alias data to identify one or more select alias records containing a preferred alias representation; adding a preferred alias token to the one or more select alias records; locating one or more candidate aliases from among the alias data by comparing the subjective representation to the alias data; selecting a preferred alias from among the one or more candidate aliases, the preferred alias being most closely associated with the preferred alias token; releasing the preferred alias as a candidate representation.

The step of locating one or more candidate aliases may also include (a) parsing the subjective representation into one or more discrete artifacts; (b) selecting one of the one or more discrete artifacts: (1) locating one or more candidate alias artifacts from among the source data by comparing the one discrete artifact to the alias data; (2) selecting a preferred alias artifact from among the one or more candidate alias artifacts, the preferred alias artifact being most closely associated with the preferred alias token; (3) storing the preferred alias artifact; (c) repeating step (b) for each of the one or more discrete artifacts; and (d) adding the preferred alias artifact to the preferred alias.

In another aspect of the present invention, an apparatus is provided for executing the method steps described immediately above. The apparatus may include a central processing unit; a memory; a basic input/output system; program storage containing a program module executable by the central processing unit, in which the program module may include means for executing each step in the method described above.

In another aspect of the present invention, a method is provided for controlling access to a database by one or more external applications. The method may include establishing and storing a plurality of rule sets, each correlated to one of the one or more external applications; receiving a request from a first application; retrieving a first rule set correlated to the first application; applying the first rule set to control the interaction between the first application and the database. In the method, the first rule set may include a list of data available for capture from the database for use by the first application.

In another aspect of the present invention, a method is provided for controlling the depth of data capture within a database in response to a request from one or more external applications. The method may include establishing and storing a plurality of rule sets, each correlated to one of the one or more external applications, each of the plurality of rule sets including a list of data to capture from the database; receiving a request from a first application; retrieving a first rule set correlated to the first application; and applying the first rule set to limit the data available to the first application from the database.

In another aspect of the present invention, a data structure is provided which may include a database linking a primary table and one or more secondary tables, each of the tables sharing a common data structure; the database controlled by a database management system configured to transform one or more of the primary and one or more secondary tables into a sparse matrix linked list. The database may include one or more interconnected relational databases. The database management system may include an interface and a validation module. The interface may controls access to the database by one or more external applications. The database management system may be configured to convert data from a subjective representation into a preferred representation.

These and other objects are accomplished by the apparatuses, methods, and systems disclosed and will become apparent from the following detailed description of a preferred embodiment in conjunction with the accompanying drawings in which like numerals designate like elements.

BRIEF DESCRIPTION OF THE DRAWING

The invention may be more readily understood by reference to the following description, taken with the accompanying drawing figures, in which:

FIG. 5 is a graphical illustration of a data table according to one embodiment of the present invention.

FIG. 6 is a graphical illustration of values in a table, according to one embodiment of the present invention.

FIG. 9 is a table of address data according to one embodiment of the present invention.

FIG. 11 is a table of address data with tokens, according to one embodiment of the present invention.

FIG. 13 is a table of alias data according to one embodiment of the present invention.

DETAILED DESCRIPTION OF THE INVENTION

Figure 1:
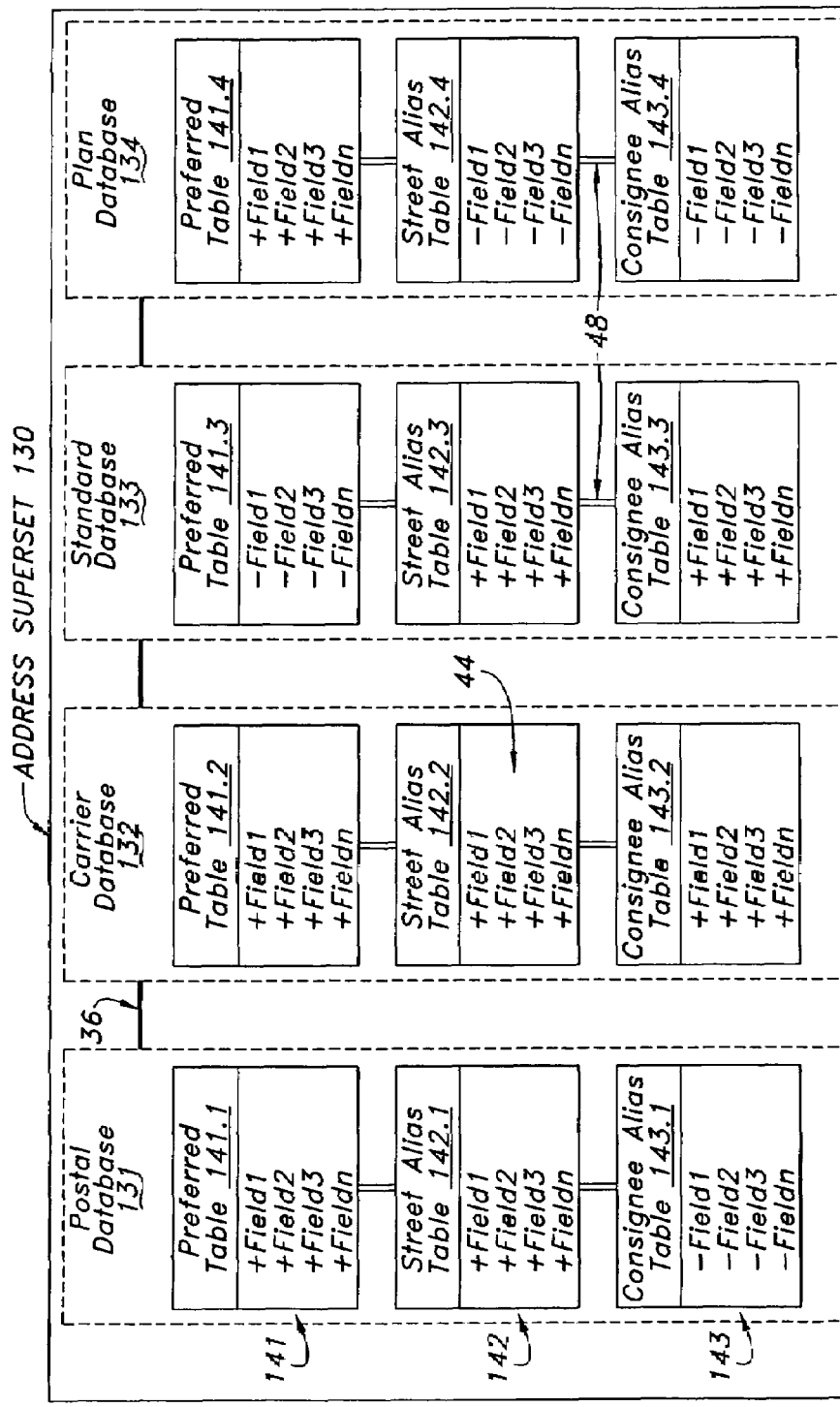
FIG. 1 is a block diagram of an address superset according to one embodiment of the present invention.

Reference is now made to the figures, in which like numerals indicate like elements throughout the several views.

1. INTRODUCTION

As used in this application, the term "computer component" refers to a computer-related entity, either hardware, firmware, software, a combination thereof, or software in execution. For example, a computer component can be, but is not limited to being, a process running on a processor, a processor itself, an object, an executable, a thread of execution, a program, a server, and a computer. By way of illustration, both an application running on a server and the server itself can be referred to as a computer component. One or more computer components cans reside within a process and/or thread of execution and a computer component can be localized on a single computer and/or distributed between and among two or more computers.

"Computer communications," as used herein, refers to a communication between two or more computer components and can be, for example, a network transfer, a file transfer, an applet transfer, an e-mail, a Hyper-Text Transfer Protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Logic," as used herein, includes but is not limited to hardware, firmware, software and/or combinations of each to perform one or more functions or actions. For example, based upon a desired application or needs, logic may include a software controlled microprocessor, discrete logic such as an Application-Specific Integrated Circuit (ASIC), or other programmed logic device. Logic may also be fully embodied as software.

"Signal," as used herein, includes but is not limited to one or more electrical or optical signals, analog or digital, one or more computer instructions, a bit or bit stream, or the like.

"Software," as used herein, includes but is not limited to, one or more computer readable and/or executable instructions that cause a computer, computer component and/or other electronic device to perform functions, actions and/or behave in a desired manner. The instructions may be embodied in various forms like routines, algorithms, stored procedures, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel-processing computer components and thus can be loaded and/or executed in serial, parallel, massively parallel and other manners. It will be appreciated by one of ordinary skill in the art that the form of software may be dependent on, for example, requirements of a desired application, the environment in which it runs, and/or the desires of a designer or programmer or the like.

An "operable connection" (or a connection by which entities are "operably connected") is one in which signals, physical communication flow and/or logical communication flow may be sent and/or received. Usually, an operable connection includes a physical interface, an electrical interface, and/or a data interface, but it is to be noted that an operable connection may consist of differing combinations of these or other types of connections sufficient to allow operable control.

"Database," as used herein, refers to a physical and/or logical entity that can store data. A database, for example, may be one or more of the following: a data store, a relational database, a table, a file, a list, a queue, a heap, and so on. A database may reside in one logical and/or physical entity and/or may be distributed between two or more logical and/or physical entities.

The terms "fuzzy" or "blurry" refer to a superset of Boolean logic dealing with the concept of partial truth; in other words, truth values between "completely true" and "completely false." Any specific theory or system may be generalized from a discrete or crisp form into a continuous or fuzzy form. A system based on fuzzy logic or fuzzy matching may use truth values that have various degrees similar to probabilities except the degrees of truth do not necessarily need to sum to one. In terms of applying fuzzy matching to a string of alpha-numeric characters, the truth value may be expressed as the number of matching characters in the string, for example.

The systems, methods, and objects described herein may be stored, for example, on a computer readable media. Media may include, but are not limited to, an ASIC, a CD, a DVD, a RAM, a ROM, a PROM, a disk, a carrier wave, a memory stick, and the like. Thus, an example computer readable medium can store computer executable instructions for a method for managing transportation assets. The method includes computing a route for a transportation asset based on analysis data retrieved from an experience based travel database. The method also includes receiving real-time data from the transportation asset and updating the route for the transportation asset based on integrating the real-time data with the analysis data.

It will be appreciated that some or all of the processes and methods of the system involve electronic and/or software applications that may be dynamic and flexible processes so that they may be performed in other sequences different than those described herein. It will also be appreciated by one of ordinary skill in the art that elements embodied as software may be implemented using various programming approaches such as machine language, procedural, object oriented, and/or artificial intelligence techniques.

The processing, analyses, and/or other functions described herein may also be implemented by functionally equivalent circuits like a digital signal processor circuit, a software controlled microprocessor, or an application specific integrated circuit. Components implemented as software are not limited to any particular programming language. Rather, the description herein provides the information one skilled in the art may use to fabricate circuits or to generate computer software to perform the processing of the system. It will be appreciated that some or all of the functions and/or behaviors of the present system and method may be implemented as logic as defined above.

Furthermore, to the extent that the term "includes" is employed in the detailed description or the claims, it is intended to be inclusive in a manner similar to the term "comprising" as that term is interpreted when employed as a transitional word in a claim. Further still, to the extent that the term "or" is employed in the claims (for example, A or B) it is intended to mean "A or B or both." When the author intends to indicate "only A or B but not both," the author will employ the phrase "A or B but not both." Thus, use of the term "or" herein is the inclusive use, not the exclusive use. See Bryan A. Garner, A Dictionary Of Modern Legal Usage 624 (2d ed. 1995).

2. EXEMPLARY EMBODIMENT

The system of the present invention is often described herein, by way of example, in the context of its usefulness as an address management system. Although the address-related example may be described in considerable detail, it is not the intention of the applicants to restrict or in any way limit the scope of the invention to such detail. Additional uses, applications, advantages, and modifications of the inventive system will be readily apparent to those skilled in the art. Therefore, the invention, in its broader aspects, is not limited to the specific details, the representative apparatus, and illustrative examples shown and described. Accordingly, departures may be made from such details without departing from the spirit or scope of the general inventive concept.

Example apparatuses, methods, systems, processes, and the like, are now described with reference to the drawings, where like reference numerals are used to refer to like elements throughout. In the following description, for purposes of explanation, numerous specific details are set forth in order to facilitate a thorough understanding of the apparatuses, methods, systems, processes, and the like. It may be evident, however, that the apparatuses, methods, systems, processes, and the like, can be practiced without these specific details. In other instances, well-known structures and devices are shown in block diagram form in order to simplify the description.

3. DATA STRUCTURE: THE SUPERSET

3.1. A Data Superset

Figure 2:
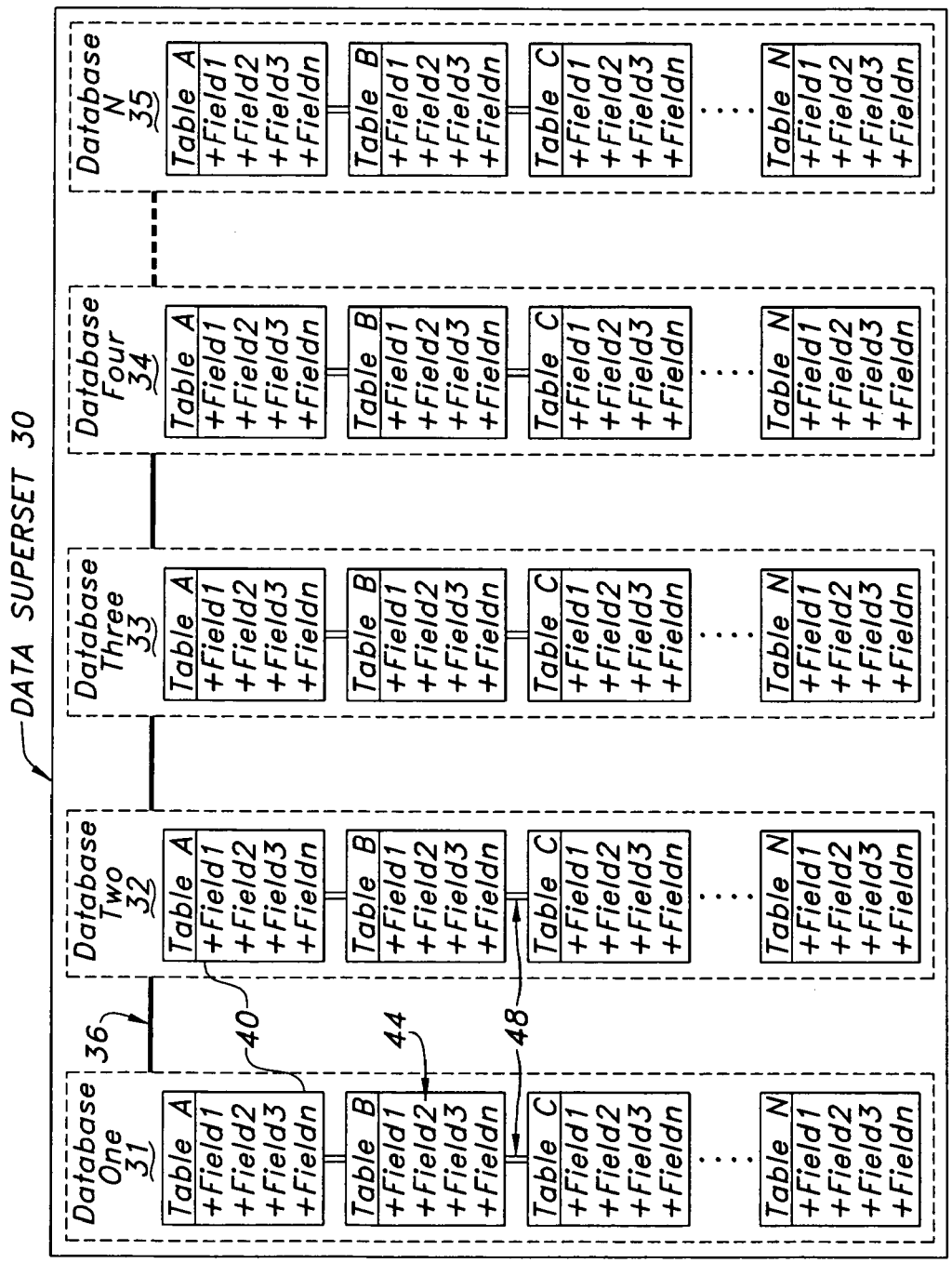
FIG. 2 is a block diagram of a generic dataset according to one embodiment of the present invention.

In one embodiment, as illustrated in FIG. 2, the system of the present invention may include a data superset 30. The data superset 30 may include four or more discrete, relational databases 31-35 (including Databases One, Two, Three, Four, . . . N, as shown). The databases 31-35 may be connected to the others in a network of database links 36. In one embodiment, one of the databases 31-35 may be designated as primary and the others as secondary. Together, the several relational databases 31-35 may be controlled by a database management system in order to create a single data superset 30 that is capable of storing large amounts of data and executing complex queries in an ordered way across all the relational database tables.

The relational databases 31-35 may contain a set of tables 40 (including Tables A, B. C, . . . N, as shown). The tables 40 may contain a set of data fields 44 (including Field1, Field2, Field3, . . . Fieldn, as shown). The tables 40 maybe linked together using one or more keys 48 in a manner known in the art of relational databases.

In one embodiment, each database 31-35 may have a common data structure. In this aspect, each relational database 31-35 may include the same number of tables 40, and each table may include the same number of fields 44. The common data structure among the various tables 40 in the data superset 30 may provide a degree of flexibility that allows the storage and processing of any type of data.

The common data structure in one embodiment may include arranging the records in one or more tables 40 in hierarchical order, in a series of levels from general to specific, based upon the value of the stored data, as described in more detail below. The common data structure may also include storing the tables 40 as a sparse matrix linked list.

3.2. An Address Superset

One exemplary embodiment of the data superset is illustrated in FIG. 1. An address superset 130 may include several discrete, relational databases, including in one embodiment a postal database 131, a carrier database 132, a standard database 133, and a plan database 134. The databases 131-134 may be connected to the others in a network of database links 36, as shown, to form an address superset 130. The relational databases 131-134 may be controlled by an address database management system.

The relational databases 131-134 may contain a set of data tables 140, including in one embodiment a Preferred Table 141, a Street Alias Table 142, and a Consignee Alias Table 143, as described in more detail below. The Preferred Tables 141 may also include one or more fields for storing a token to act as a unique identifier for a particular record. The tables 141, 142, 143 may contain a set of data fields 44 (including Field1, Field2, Field3, . . . Fieldn, as shown). The tables 141, 142, 143 may be linked together using one or more keys 48 in a manner known in the art of relational databases.

In one embodiment, each database 131-134 may have a common data structure. In this aspect, each relational database 131-134 may include the same number of tables 141-143, and each table may include the same number of fields 44. The common data structure among the various tables in the address data superset 130 may provide a degree of flexibility that allows the storage and processing of any type of data. The common data structure in one embodiment may include arranging the records in one or more tables in hierarchical order, in a series of levels from general to specific, based upon the value of the stored address data, as described in more detail below. The common data structure may also include storing or re-formatting the tables as a sparse matrix linked list.

4. SYSTEM ARCHITECTURE

Figure 3:
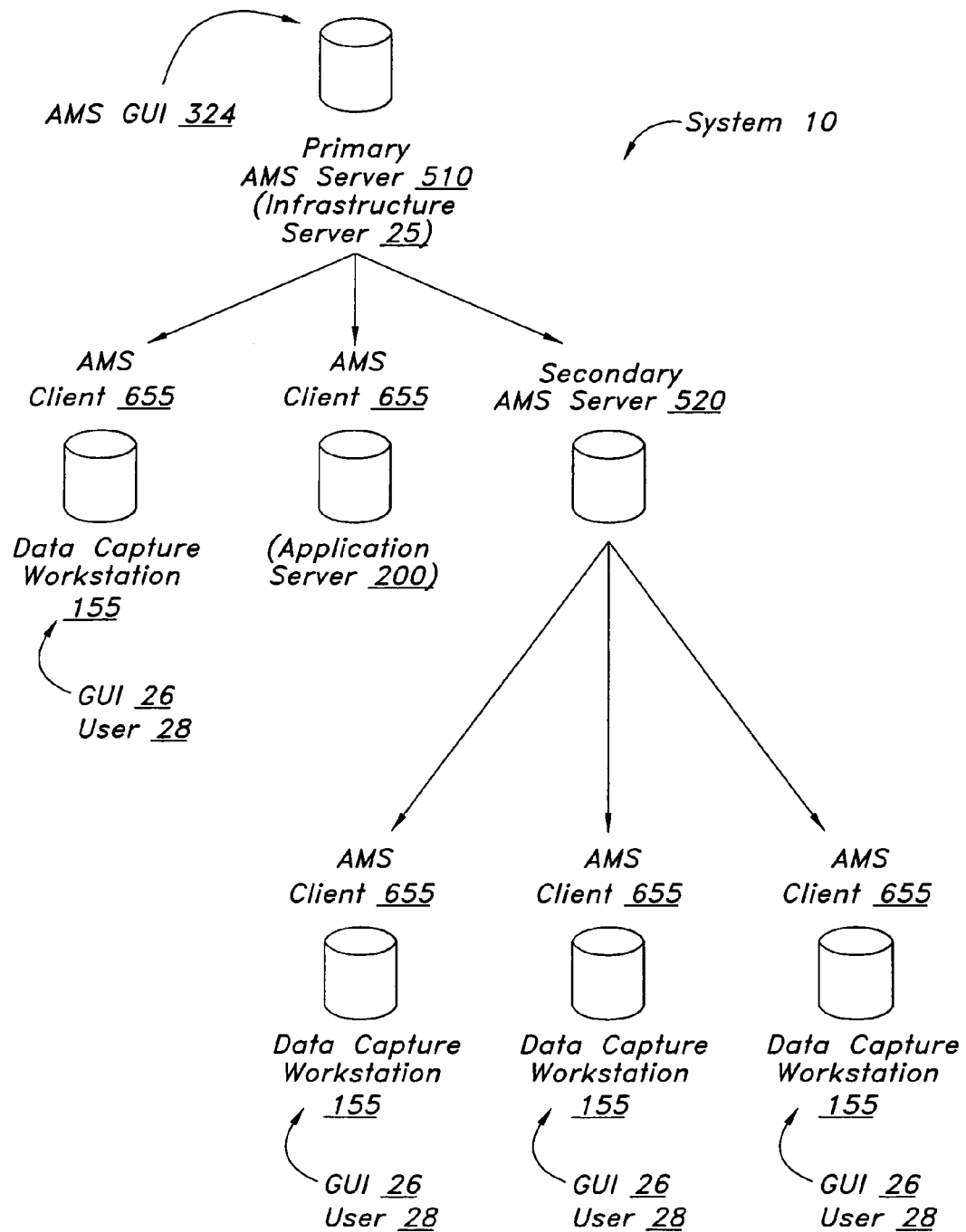
FIG. 3 is an illustration of a system architecture according to one embodiment of the present invention.

FIG. 3 is a representational diagram of a system 10 according to one embodiment of the present invention. The system 10 may include an infrastructure server 25, one or more computer networks, an application server 200, and one or more clients 655 distributed in a multi-tiered server-client relationship. The one or more computer networks facilitate communications between the infrastructure server 25, the application server 200, and the one or more clients 255. The one or more computer networks may include a variety of types of computer networks such as the internet, a private intranet, a private extranet, a public switch telephone network (PSTN), a wide area network (WAN), a local area network (LAN), or any other type of network known in the art.

As shown in FIG. 3, a primary AMS server 510 may reside on an infrastructure server 25. A graphical user interface such as an AMS GUI 324 may communicate with the primary AMS server 510 as shown.

The next tier in the system 10 in one embodiment may include several AMS clients 655 and a secondary AMS server 520. Some of the AMS clients 655 may include a data capture workstation 155 and a GUI 26 for one or more users 28. In one embodiment, an application server 200 may reside on an AMS client 655.

Descending from the secondary AMS server 520, in one embodiment, the next tier may include several AMS clients 655, each including a data capture workstation 155 and a GUI 26 for one or more users 28.

The infrastructure server 25 in an exemplary embodiment, may include a central processor that communicates with other elements within the infrastructure server 25 over a system interface or bus. Also included in the infrastructure server 25 may be an input and display device for receiving and displaying data. The input and display device may be, for example, a keyboard or pointing device used in combination with a monitor. The infrastructure server 25 may further include a memory, which may include both read only memory (ROM) and random access memory (RAM). The ROM may be used to store a basic input/output system (BIOS), which contains the basic routines that help transfer information between and among elements of the infrastructure server 25.

In addition, the infrastructure server 25 may include at least one storage device, such as a hard disk drive, a floppy disk drive, a CD-ROM drive, or an optical disk drive, for storing information on various computer-readable media, such as a hard disk, a removable magnetic disk, or a CD-ROM disk. Each of these types of storage devices may be connected to the system bus by an appropriate interface. The storage devices and their associated computer readable media may provide non-volatile storage. It is important to note that the computer readable media described above may be replaced by any other type of computer readable media known in the art. Such media include, for example, magnetic cassettes, flash memory cards, digital video disks, and Bernoulli cartridges.

A number of program modules may be stored by the various storage devices within the RAM. Such program modules include an operating system and one or more applications. Also located within the infrastructure server 25 may be a network interface, for interfacing and communicating with other elements of a computer network. One or more components of the infrastructure server 25 may be geographically remote from other processing components. Also, one or more of the components may be combined. The infrastructure server 25 may include additional components for performing the functions described herein.

4.1. A Database Management System (DBMS)

According to one embodiment of the present invention, a database management system (DBMS), referring again to FIG. 3, may reside on a primary AMS server 510 (the infrastructure server 25), an Application Server 200, or a secondary AMS server 520. The DBMS may include an interface 600 and a suite of programs 500, similar to the AMS 110 shown in FIG. 4.

By way of example, a database management system (DBMS) of the present invention may be described in the context of its usefulness as an address management system (AMS) 110. Like the DBMS, the AMS 110 may reside on a primary AMS server 510 (the infrastructure server 25), an Application Server 200, or a secondary AMS server 520. In one embodiment, the AMS 110 may include an interface 600 and a suite of programs 500, as shown in FIG. 4.

Figure 4:
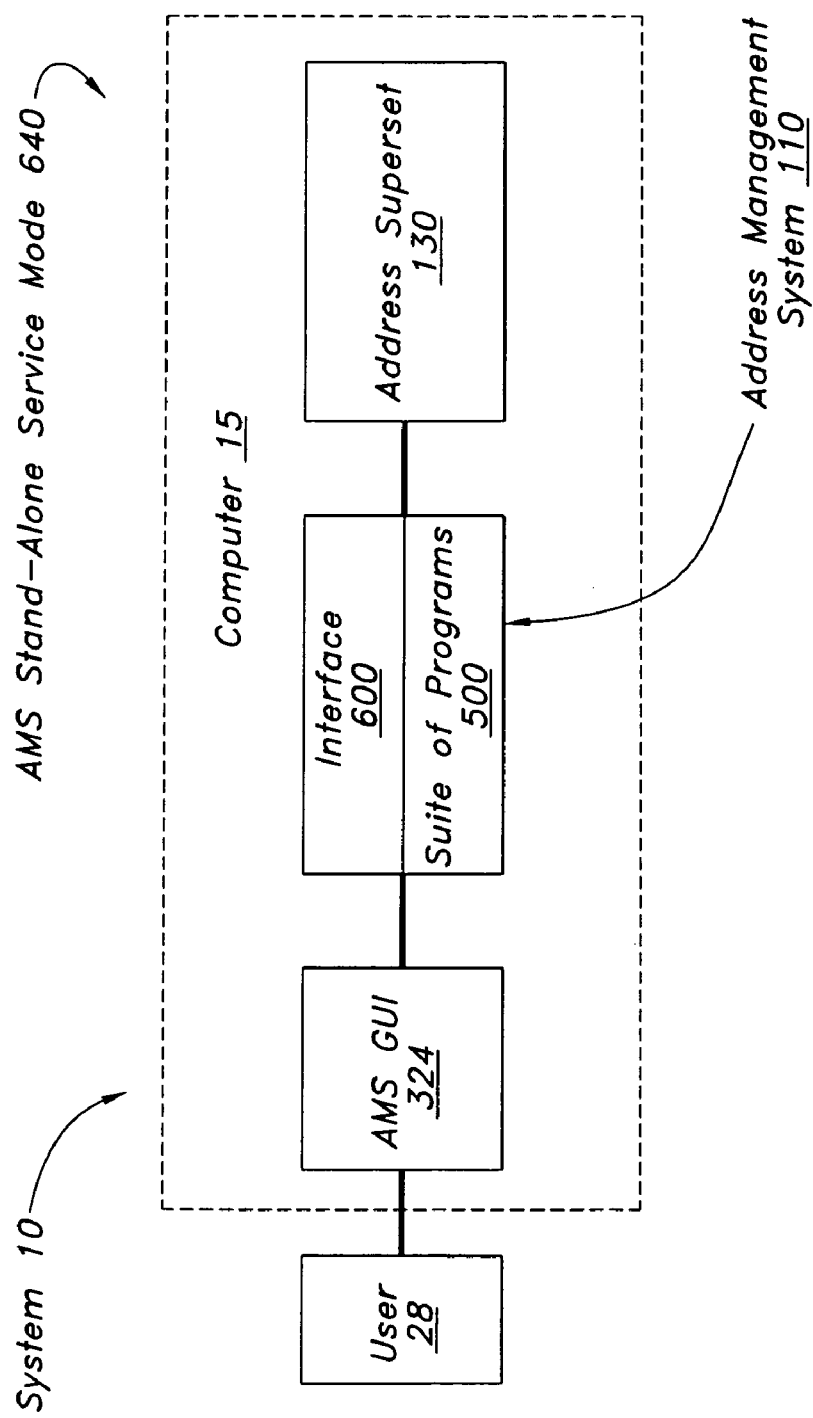
FIG. 4 is a block diagram of a stand-alone service mode according to one embodiment of the present invention.

FIG. 4 is a block diagram of a system 10 according to one embodiment of the present invention that depicts an AMS 110 operating in Stand-Alone Service Mode 640. The system 10 as shown includes a computer 15 that provides access to one or more users 28 through an AMS GUI 324.

4.2. An Address Management System (AMS)

The address management system (AMS) 110 may be specifically designed to control the organization, storage, and retrieval of data in an address data superset 130, and to control the security and integrity of the address superset 130 and its component databases. The interface 600 may be configured to accept and process requests for data received from external applications (not shown). In one embodiment, the interface 600 may be a COM-based interface with the capacity to create, read, update, and delete records. The interface 600 may also include a query function for performing operations on the data stored in the address superset 130.

5. FINDING A PREFERRED REPRESENTATION

In one embodiment, the system 10 of the present invention may include a database management system (DBMS) for a data superset 30. The DBMS may also be useful as a database management system for any type of data, including address data. In the context of address data, the DBMS may be referred to as an address management system (AMS) 110. In any capacity, the management system 110 may include an interface 600 and a suite of programs 500.

In one embodiment, the suite of programs 500 may include one or more computer software programs for receiving raw data in a "subjective representation," analyzing values stored in a database by using an interface 600 to execute one or more queries, and producing output data in a "preferred representation."

The term "subjective representation" is used herein to indicate raw data entered or submitted by someone whose understanding of the data may be personal to that individual. Subjective representations tend to be ambiguous or incomplete, which may be problematic when the raw data is needed to perform computing steps. For example, a person may enter a date of birth using the subjective representation "12-4-63." In the United States, this date may indicate "December 4th," whereas in Europe it may signify "12th April." A computer component may interpret the year as 1963 or 63. These ambiguities have a serious impact on the accuracy of the raw data. To remove the ambiguities and incompleteness, a suite of programs 500 may be designed to convert the subjective representation into a "preferred representation." Such a suite of programs 500, for example, may include a system or query for determining whether the user is entering the date in U.S. format or in European format. A suite of programs 500 may also include a rule or logic routine setting the 0s as the default century for all years entered, unless the user enters a four-digit year. Designing and building a suite of programs 500 requires forethought and planning about the types and formats of raw data to expect in a particular system.

A subjective representation may be processed by a suite of programs 500 into a preferred representation that is generally unrelated to the raw data. For example, a customer may order a printer cartridge using the subjective representation "Acme LX-709 Color" where. Acme is the printer manufacturer, LX-709 is the model number of the printer, and color ink is desired. In a system for processing printer cartridge orders, for example, the cartridges may be catalogued and stored using a ten-digit cartridge serial number. The serial number is not directly related to the text and digits in the raw data; however, the serial number is the "preferred representation" to be printed on a purchase order, so the seller can locate and ship the desired cartridge. To match the subjective raw data to the correct serial number, a suite of programs 500 may be written to interpret any variety of potential indicators submitted by a customer. Suppose the first four digits of every cartridge serial number corresponds to a list of printer manufacturers who build machines capable of using that type of cartridge. A suite of programs 500 may include a stored procedure for comparing the printer manufacturer name entered to the names in the list, and finding the corresponding first four digits of the cartridge serial number. This represents a first step toward finding the ten-digit serial number to print on the purchase order.

Another example of a subjective representation is a common street address. On a mail piece, a person may write the subjective representation "Doe, 123 East Main Street N.W., Suite A-4, Atl 30030." Several parts of the address are ambiguous or incomplete, including the addressee "Doe," the abbreviation "Atl," and the missing State name. If this data were destined for processing by a computer or sorting equipment, these ambiguities may result in the loss, delay, or incorrect delivery of the mail piece. To remove the ambiguities and incompleteness, a suite of programs 500 may be designed to convert the subjective representation into a preferred representation. Such a suite of programs 500, for example, may include a program or a stored procedure for comparing the written address to a commercially available computer database of street addresses and ZIP codes.

The examples described above refer to an attribute or parameter—a date, a part number, an address. A parameter may be characterized in a variety of formats, including the subjective representations shown above and other representations depending on the context of use. The system of the present invention, in one embodiment, uses tabulated data to manipulate and modify the way a parameter is characterized, as described in more detail below.

In one embodiment, the a database management system (DBMS) of the present invention, my include a suite of programs 500, which may include one or more of the following general procedures: (1) an Enhancement module; (2) a Publish & Subscribe module; and (3) a Matching module. The suite of programs 500 may include additional components and procedures, of course, for performing the other functions described in this application.

5.1. An Enhancement Module

In one embodiment, the suite of programs 500 of the present invention may include an Enhancement module suitable for use in optimizing the structure and order of the data stored in the relational databases 31-35 of a data superset 30. Each database 31-35 in a data superset 30 may include millions of records. The tasks of reading, updating, and searching through all or most of the records in each database 31-35 may be improved and expedited, in one embodiment, by optimizing the structure of the data.

Database tables including a large number of records consume large amounts of memory and require lengthy computing times for performing sorting, searching and other analytical operations. A simple example of enhancing or optimizing data is to sort the records based upon one or more attributes (columns), to place the records in order, increasing or decreasing. For large tables with multiple attributes, however, a simple record sort does not yield significant time savings or searching efficiency.

In one embodiment, one kind of Enhancement module in the suite of programs 500 includes a procedure for transforming a database into a sparse matrix linked list. A linked list includes a link designed to direct a query from one field to the next, sometimes using the link to bypass or skip irrelevant fields. A sparse matrix includes no repeated field values in subsequent records. Instead of repeating a first value, the subsequent fields are left blank and subsequent values are presumed to be equal to the first value unless and until a different value appears.

For example, in FIG. 9, the ZIP code field includes a repetitive entry (the ZIP code 20001) in each of the thirteen records. In one aspect, the system 10 of the present invention uses the concept of a sparse matrix to eliminate repetitive entries and thereby save memory and shorten computing times. In FIG. 9, for example, the ZIP code for Node 1 may be populated by the five digit ZIP code 20001. In the system 10 of the present invention, where a table may be transformed into a sparse matrix, the subsequent ZIP code fields would be made empty or zeroed. In FIG. 9, the ZIP code field for Node 2 through Node 13 would be empty or zero; and the value in those fields would be presumed to be 20001.

In a sparse matrix the value encountered in the sequence of records is presumed to remain the same until a different value appears. Because many repeated values may be eliminated in this way, the table or matrix is described as being sparse. Any attribute in a table may be made sparse by applying the rules for creating a sparse matrix.

A small portion of a model database table 40 is shown in FIG. 5. Each row contains a single record 42. Each field 44 may be located by referring to the row and column numbers. The field located in Row 3 of Column 2, for example, may be described as Field (3,2) or simply (3,2). This field-naming convention is of value in many database operations where pointing to a particular field is desired.

The table 40 of FIG. 6 is an example of a sparse matrix. Column 2, for example, begins with the value "Smith" in Row 1 and is followed in subsequent records (row) by a zero value. Accordingly, the value of Column 2 is understood to be "Smith" in subsequent rows 2, 3, and 4.

Figure 7:
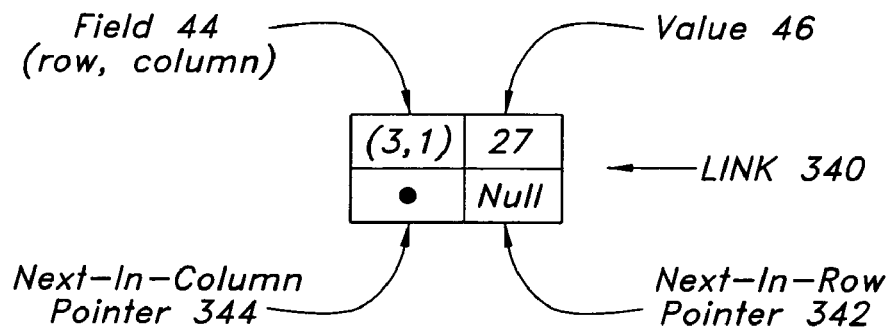
FIG. 7 is a block diagram of a link according to one embodiment of the present invention.
Figure 8:
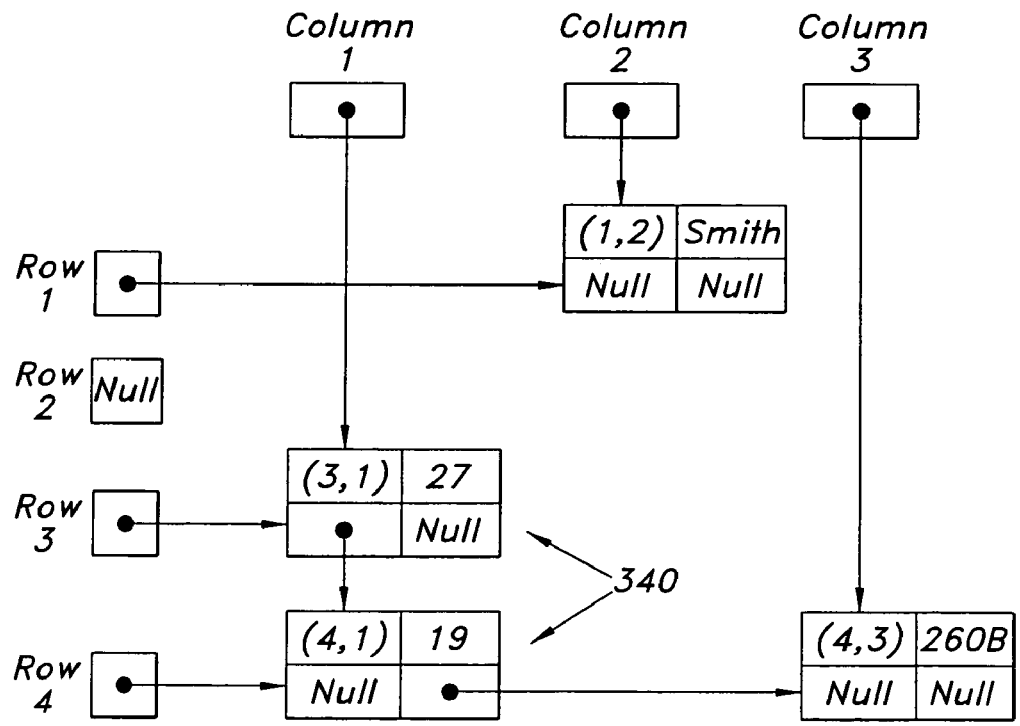
FIG. 8 is a block diagram of a linked list according to one embodiment of the present invention.

The row-and-column naming convention for fields is helpful when a table is organized as a linked list. In one type of linked list, a link 340 may include a field 44, a value 46, and one or more pointers, as shown in FIG. 7 and FIG. 8. In one type of link 340, shown in FIG. 7, a next-in-column pointer 344 is included, along with a next-in-row pointer 342. The pointers 344, 342 include instructions to the next field containing a non-zero value. Because they point to the next field (as opposed to the last field) these pointers 344, 342 are referred to as forward pointers. Some types of linked lists also include backward pointers, with instructions directed toward the last or previous non-zero field value. In one aspect, the system 10 of the present invention may include only forward pointers.

FIG. 8 is a representation of the links 340 between the sparse matrix values shown in FIG. 6. The instructions in link 340 for Row 4, Column 1, for example, would quickly direct the analysis to the next non-zero value located in Row 4, Column 3. The instructions contained in link 340 allow an analytical process such as a search query to bypass or skip the empty fields in a sparse matrix. By skipping empty fields, the searching time is greatly reduced, producing faster results from the query.

In one embodiment, a suite of programs 500 including an Enhancement module may be used to transform any table in a data superset 30 into a sparse matrix linked list. A data superset 30 stored as a sparse matrix linked list may consume far less memory, and therefore may be more suitable for distribution as a duplicate superset 330 to subscriber clients 255. When a data table has been transformed into a sparse matrix linked list (SMLL) table, the Enhancement module may finalize or otherwise "wrap" the SMLL table to prepare it for distribution and use by other system components and elsewhere.

As shown in FIGS. 5-8, a duplicate superset 330 may reside on the one or more clients 255 in the system 10. The transmission or "publication" of a duplicate superset 330 throughout the system 10 may be accomplished using a Publish & Subscribe module, as discussed below.

The Enhancement module in one embodiment may also monitor the condition of tables as new data is added, maintain the tables in optimal condition by repeating the transformation procedure as necessary, and communicating with other system components regarding the condition of tables and their availability to be shared or distributed to subscriber clients 255. In this aspect, the Enhancement portion of the suite of programs 500 may be configured to interact and communicate with other system components to maintain data tables in optimal condition for fast and efficient searching.

5.2. A Publish & Subscribe Module

In one embodiment, the suite of programs 500 of the present invention may include a publication and subscription program or procedure to control and facilitate the transfer of data between components of the system 10 of the present invention. As illustrated in FIG. 3, the system 10 may include an infrastructure server 25, one or more computer networks 230, an application server 200, and one or more clients 255 distributed in a server-client relationship.

In a server-client network environment, such as the ones illustrated in FIGS. 5-9 for example, a duplicate superset 330 may reside on the one or more subscriber clients 255 in the system 10. A Publish & Subscribe module may be configured to monitor and control the publication of a duplicate superset 330 throughout the system 10 to clients 255 who are subscribers.

5.3. A Matching Module

In one embodiment, the suite of programs 500 of the present invention may include a Matching module 85 configured to receive raw data in a subjective representation 80, analyze the values stored in a data superset 30 using an interface 600 to execute one or more queries, and produce output data in a preferred representation 90. The general steps in an exemplary Matching module 85 are shown as a flow chart in FIG. 12.

The steps of finding and displaying data in its preferred representation 90, based on a subjective representation 80, in one embodiment may involving the following general functions: capture 300, parse 305, standardize 310, validate 320, update 380, combine 390, and release 395. One skilled in the art may understand these general steps need not necessarily occur in this order, and some steps may be repeated as necessary, according to one or more specific algorithms.

5.3.1. Capture. The step referred to as capture 300 in one embodiment may involve capturing or otherwise receiving the subjective representation 80 (input data).

5.3.2. Parse. The step referred to as parse 305 in one embodiment may involve parsing the subjective representation 80 into its component parts. The task of parsing generally involves dividing a sentence or character string into its component parts. In the context of a street address, for example, the address written on an envelope represents a subjective representation 80 that may be divided into many different components or artifacts through the process of parsing. A parsing algorithm or program generally receives the input as a sequence or string of characters and then applies a set of rules to accomplish the division by category.

One example of a subjective representation 80 is a street address. For example, a U.S. street address such as "123 East Main Street N.W., Suite A-4" may include a number of discrete artifacts, including a Number (123), a Pre-directional (East), a Primary Name (Main), a Type (Street), a Post-directional (NW), a Secondary Name (Suite), and a Secondary Number (A-4). A street address may also be parsed into components based upon political subdivisions such as cities, counties and states, or it may be parsed to a finer level of detail or granularity, based upon the ZIP+4 code, for example.

By parsing a subjective representation 80 and storing its component parts in separate fields of a table, for example, the Matching module 85 of the present invention may allow users to access and summarize (or "abstract") the data in a variety of ways, depending upon the need and the application. For example, a user may request a summary or abstract of address data based upon the five-digit ZIP code in a particular state. If address data has been parsed and the ZIP code is stored in a discrete field, the step of abstracting the data based upon ZIP code involves a relatively simple search and retrieval. Storage of the artifacts in separate fields may allow the user to search and retrieve data using any level of abstraction. In this aspect, the invention provides a great deal of flexibility to various users with various needs.

5.3.3. Standardize. The step referred to as standardize 310 in one embodiment may generally involve re-formatting a subjective representation 80 according to a set of standardization rules. Standardization in general may involve many characteristics of a subjective representation 80, including the font, spacing, typeface, punctuation, whether a field may include alphabetic or numeric characters or both, the length of the field, the size or capacity of the field, and other aspects.

In the context of a street address for example, a subjective representation 80 may be written as:

John Doe

123 East Main Street, N.W.

Oakland Center, Suite A-4

Atlanta, Ga. 30030

The step referred to as standardize 310 may alter the font, spacing, punctuation, and other aspects of the subjective representation 80 above, such that it may appear after standardization as:

JOHN DOE
123 E MAIN ST NW STE A4
DECATUR GA 30030-1549

The standardize step 310 in one embodiment may include a variable set of rules, depending upon the type of address and the region or country. Foreign addresses, for example, may have very different rules governing the standard presentation of various address artifacts. For example, the following subjective representations 80 may be standardized:

| Subjective Representation 80: | Standardized: |
| --- | --- |
| Prielle Kelia U. 19-15 | BUDAPEST XI |
| Budapest H-2100 | PRIELLE KELIA U. 19-35 |
| Hungary | 1117 |
|  | HUNGARY |
| V. Delle Terme | LARGO DELLE TERME |
| Rome 00100 | 00153 - ROMA RM |
| Italy | ITALY |
| 103 New Oxford | 103 NEW OXFORD ST |
| London WC1A 1 PG | LONDON |
| Great Britain | WC1A 1PG |
|  | UNITED KINGDOM |

The standardize step 310 may be performed in conjunction with the parse step 305 so that the parsed artifacts are stored in the tables in their standardized format. In one embodiment, the standardize step 310 may be performed on each separate artifact after parsing, while in another the parse step 305 may take place first. As with the other general steps in the Matching module 85, the standardize 310 and parse 305 steps may take place in any order, and may be repeated.

5.3.4. Validation Module. The step referred to as validate 320 in one embodiment may involve a complex series of steps undertaken to validate a subjective representation 80, as described in more detail below. Validation 320 generally involves checking the accuracy and recency of a subjective representation 80. Validation 320 may also include comparing a subjective representation 80 to the values stored in tables in the superset 30 and thereby searching for a preferred representation 90.

5.3.5. Update. The step referred to as update 380 in one embodiment may involve adding newly acquired data to one of the relational databases in the superset 30. In this aspect, the superset 30 by and through the operation of the suite of programs 500 may be updated continually based upon new data. The update step 380 may occur at any time during the procedures executed by the Matching module 85.

In one embodiment, the update step 380 may add new data to one of the tables in the superset. The data may be placed in records located near the end of a table. In one aspect of the invention, the table may or may not be recompiled before the tasks of the enhancement module are next executed. The tables as designed do not require frequent compiling.

5.3.6. Combine. The step referred to as combine 390 in one embodiment may involve the reversal of the parse step 305, in that the separate artifacts of a subjective representation 80 are re-assembled. In one embodiment, the combine step 390 is executed after the validate step 320 has produced the artifacts of a preferred representation 90.

5.3.7. Release and Display. The step referred to as release 395 in one embodiment may involve the transmission or sending of the preferred representation 90 (or a preferred token) to one or more components of the system 10 of the present invention. In this aspect, the release step 395 may be described as returning or publishing the results of the search query. The release step 395 may also include or be followed by a display step, in which the preferred representation 90 may be displayed on a monitor or other type of user display. The release step 395 may further include or be followed by a printing step, in which the preferred representation 90 may be printed onto a label, in a list, as part of a report, or otherwise sent in readable text format as directed by the system.

5.4. Validation Module

The validation step 320 in one embodiment may generally include comparing a subjective representation 80 to the values stored in tables in the superset 30 and thereby searching for a preferred representation 90. In the context of an address management system 110, address validation 320 generally involves comparing the subjective representation 80 of an input address to the values stored in address databases 131, 132, 133 in an address superset 130 (as shown in FIG. 1), and identifying the preferred representation 90 for the address.

As illustrated in FIG. 1, the address superset 130 may include in one embodiment a postal database 131, a carrier database 132, a standard database 133, and a plan database 134. Each relational database 131-134 may include in one embodiment a preferred table 141, a street alias table 142, and a consignee alias table 143. The preferred tables 141 may also include one or more fields for storing a token to act as a unique identifier for a particular record.

Postal Database 131 in one embodiment may include address data from a postal service, such as the U.S. Postal Service (USPS). The United States includes more than 145 million deliverable addresses. The USPS offers a variety of address databases to the public which are updated regularly, including the Delivery Sequence File (DSF). DSF is a computerized database developed by the USPS which includes a complete, standardized address, stored in a discrete record, for every delivery point serviced by the USPS. Each separate record contains the street address, the ZIP+4 code, the carrier route code, the delivery sequence number (walk sequence number), a delivery type code, and a seasonal delivery indicator. The USPS recently developed a new Delivery Point Validation (DPV) database to replace DSF. The DPV database is available in its basic format or in its enhanced format called $DSF^2$ (which includes additional address attributes). Many foreign countries and regions offer similar databases of postal address records, including addresses standardized according to the particular needs and rules of the country. The postal database 131 of the present invention may be configured to receive and store any of a variety of databases containing postal addresses.

Within the postal database 131, the preferred table 141.1 may be configured to accept and store the preferred representation for the delivery points served by a postal authority. The preferred representation may be stored as a whole, or as separate artifacts, or both. The postal preferred table 141.1 may be one of the primary sources of preferred representations 90 of addresses.

A postal authority may also provide street alias data that may be accepted and stored in street alias table 142.1. An alias, as the name implies, refers to the situation where several different identifiers refer to the same object. A common example of a street alias occurs when a road has multiple names: a local street name, a state route number, and a federal highway number. For example, U.S. Highway 1 may be referred to as State Route 16 in a particular state, and also as Maple Street when it passes through a particular town. In the region where all three names apply, the street names Maple Street, State Route 16, and U.S. Highway 1 are street aliases. In addition, a list of street aliases may also include S.R. 16, Route 16, U.S. 1, Route 1, or Maple Drive, for example, if those names are in use. The USPS databases often include street alias data. The street alias table 142.1 may be configured to accept and store the street alias data provided by a postal authority.

Other features and artifacts are also subject to aliasing. For example, a formal company name may include terms that are not typically included by the public. For example, the Acme Shoe Corporation may be referred to in everyday parlance as Acme Shoes or simply Acme. The problem created by different names or aliases for a value to be stored in a database arises when a user of the database wants to retrieve that value specifically. A search for Acme Shoe Corporation, for example, may not find records that simply say Acme Shoes.

The consignee alias table 143.1 may be configured to accept and store the consignee alias data provided by a postal authority, when it is available. A postal authority may or may not provide consignee alias data. In some jurisdictions, like the United States, the postal service may not distribute data revealing the identity of residents (consignees) in connection with a street address. The data fields shown for the consignee alias table 143.1 (Field1, Field2, Field3, . . . Fieldn) are preceded by a hyphen instead of a + sign, to indicate these fields may be blank.

The tables 141.1, 142.1, 143.1 of the postal database 131 may be linked or otherwise interconnected using one or more key fields, in a manner known in the art of relational databases.

Carrier Database 132 in one embodiment may include address data from a private source, such as a commercial freight carrier, parcel service, or private database provider. Some delivery companies and other service providers develop and maintain address databases, some of which may be made available. The carrier database 132 of the present invention may be configured to receive and store any of a variety of private databases containing address information.

Within the carrier database 132, the preferred table 141.2 may be configured to accept and store the preferred representation for the delivery points contained in a private-source database. The preferred representation may be stored as a whole, as separate artifacts, or both.

A private source may also provide street alias data that may be accepted and stored in street alias table 142.2. Some delivery companies and other service providers develop and maintain lists of street aliases for the territories they serve. The street alias table 142.2 may be configured to accept and store the street alias data provided by any private source.

The consignee alias table 143.2 may be configured to accept and store the consignee alias data provided by a private source. In addition to street aliases, many delivery companies and other service providers develop and maintain lists of users or customers (consignees) that may include aliases. The consignee alias table 143.2 may be configured to accept and store the consignee alias data provided by any private source.

The tables 141.2, 142.2, 143.2 of the carrier database 132 may be linked or otherwise interconnected using one or more key fields, in a manner known in the art of relational databases. Similarly, the carrier database 132 may be linked or otherwise interconnected with the postal database 131.

Standard Database 133 in one embodiment may include alias data, generally. During the upload and installation of the postal database 131 and the carrier database 132, the system 10 of the present invention may include a tool to harvest street alias and consignee alias information and store it in the standard database 133. The standard street alias table 142.3 may be configured to accept and store street alias data. The standard consignee alias table 143.3 may be configured to accept and store consignee alias data. In this aspect, the standard database 133 in one embodiment may act as a repository for alias data.

Because the standard database 133 is generally for alias data, it may or may not include any preferred data in table 141.3. The data fields for the standard preferred table 141.3 (Field1, Field2, Field3, . . . Fieldn) are preceded by a hyphen instead of a + sign, to indicate these fields may be blank.

The tables 141.3, 142.3, 143.3 of the standard database 133 may be linked or otherwise interconnected using one or more key fields, in a manner known in the art of relational databases. Similarly, the standard database 133 may be linked or otherwise interconnected with the carrier database 132 and the postal database 131.

Data stored in the standard database 133 may be used in a process known as blurry or fuzzy matching. Literal matching requires an exact match, such as Acme and Acme. Fuzzy matching reveals partial matches, such as Acme, ACM, Acmed, and Ch2Acme. Alias data may be generally useful in a system where fuzzy matching is allowed or desired, because aliases by their very nature contain subtle differences yet represent the same object. The consignee aliases discussed above, for example, (Acme Shoe Corporation, Acme Shoes, Acme) also represent fuzzy matches of one another.

Fuzzy matching may be useful in the context of address standardization because the subjective representation 80 of an address may include one or more ambiguous or incorrect address artifacts. For example, the subjective representation 80 "Doe, 123 East Main Street N.W., Suite A-4, Atl 30030" is incomplete and includes several ambiguities. The addressee "Doe" may be matched with a preferred consignee "John W. Doe" through the process of fuzzy matching, using data stored in the consignee alias table 143.3 of the standard database 131. This example may illustrate how the databases 131-134 of the address superset 130 work together, because the standard database 131 may not include any preferred data in table 141.3. Accordingly, to complete the address validation 320, the address management system 110 may be configured to access related data in tables stored in other databases 131, 132, 134 in order to find a preferred representation 90 for the address. Because the tables 141, 142, 143 are linked, the search for a match may use the ZIP code "30030" alone or together with the street primary "Main" in order to find records similar to the subjective representation 80. In this aspect, the address management system 110 of the present invention in one embodiment may be configured to include programs or structured query language for finding a match among any of the data stored in the address superset 130.

Another tool that may be useful in the context of address standardization and validation is known as Soundex. Soundex provides a method of finding words that sound alike. Soundex began as a filing system and it uses a simple phonetic algorithm to reduce proper names and other words into a four-character alpha-numeric code. In one type of Soundex algorithm, the first letter of the code may correspond to the first letter of a word or proper name, and the remainder of the code may consist of three digits derived from the sound of the remaining syllables. In this way, the phonetic sound of a word or name is quantified. The Soundex function is useful because computers are generally better at comparing numbers than comparing letters. In one embodiment, the validation step 320 of the present invention may include a Soundex algorithm.

Plan Database 134 in one embodiment may include the input data, including one or more subjective representations 80. In this aspect, the process of adding the subjective representation data into the plan tables 141.4, 142.4, 143.4 may involve the steps of capturing, parsing, and standardizing described herein, so that the input data may be properly divided and standardized in preparation for validation.

In one embodiment, the input data may be stored primarily in plan preferred table 141.4. Because the plan database 134 is generally for input data, it may or may not include any data in the street alias and consignee alias tables 142.4, 143.4. The data fields for these tables are preceded by a hyphen instead of a + sign, to indicate these fields may be blank.

5.4.1. Arranging Data by Hierarchy. In one aspect, the address management system 110 of the present invention takes advantage of the hierarchical nature of address data in order to quickly and efficiently locate records similar to the subjective representation 80. In this aspect, the address management system 110 may include a method of preparing or arranging the stored data according to its inherent hierarchy. The data may be arranged in a series of levels, described below, from general to specific or in any order particularly suitable for the application. In use, the address management system 110 may be configured to include programs or stored query procedures capable of finding a match among any of the data stored in the address superset 130.

In general, a query may be used to extract the desired data from a database, without changing or altering the data itself. Because queries generally find and display the desired data to a user, the result of a query is sometimes referred to as a view. Also, a query may be used to create a result (a view) without displaying it to the user. In this aspect, a query may be used to arrange data (usually temporarily) into a new structure that is different from the table structure. A query may be used to create a new data structure that has particular advantages, such as improved logic in the arrangement, faster sorting and searching, or moving a particular data field to a more primary position, for example. The validation step 320 of the present invention in one embodiment may include one or more queries to arrange data in the superset. One such arrangement involves a process called tokenization.

5.4.2. Tokenization. An example of a postal preferred table 141.1 is depicted in FIG. 9. Each row represents a single record and includes multiple fields. Each separate field is stored in a separate column containing like attributes. The attributes of the table are shown across the top as the column names. Preferred Table 141.1 as shown in FIG. 9, may be described as having the schema (ZIP, Token, Street, Type, Lo, Hi, Odd/Even, Consignee, Sec, Lo, Hi, +4).

The Token column as shown includes a postal token 71 as a unique identifier for each unique address. Notice, the two records containing the address "440 First Street, Suite 600" have been assigned postal token T6. The other street address records in other rows of the table represent different addresses, and therefore have different tokens.

Address data by its very nature is hierarchical. The various artifacts of an address vary from the general to the specific. For example, the five-digit ZIP code by itself provides a general idea of an address location, whereas a complete address is normally understood as including the resident or consignee and all street data as well as a ZIP code or ZIP+4, provides a very specific address location.

In one embodiment, the validation step 320 of the present invention may include a query or algorithm for placing the City-State-ZIP combination at the top of an address data hierarchy. City-State combinations, of course, may include multiple ZIP codes. At the next level of specificity are the street artifacts, including a pre-directional, street name, street type, and post-directional. Such a street address may look like 100 East Main Street, SW. The street artifacts may be further subdivided by using one or more street address ranges which may be purely numeric as in the range 240-298 or may be alphanumeric depending upon the range field. Beyond the regular street artifacts are the secondary artifacts including a secondary and number, such as Suite 100 or Apartment1C. The additional four digits in a ZIP+4 code may provide yet another level of specificity. Some databases may also include an additional two-digit delivery sequence number.

The validation step 320 of the present invention, in one embodiment, may include a method of ordering the records in a table of a superset into a hierarchical structure, from general to specific. The resulting relationships and grouping of records may be defined within the validation step 320 in terms of the concepts known as containment and inclusion. A node number has been assigned to each record of the table 141.1, as shown in FIG. 9. The node numbers may help demonstrate the concepts of containment and inclusion among the address records.

Figure 10:
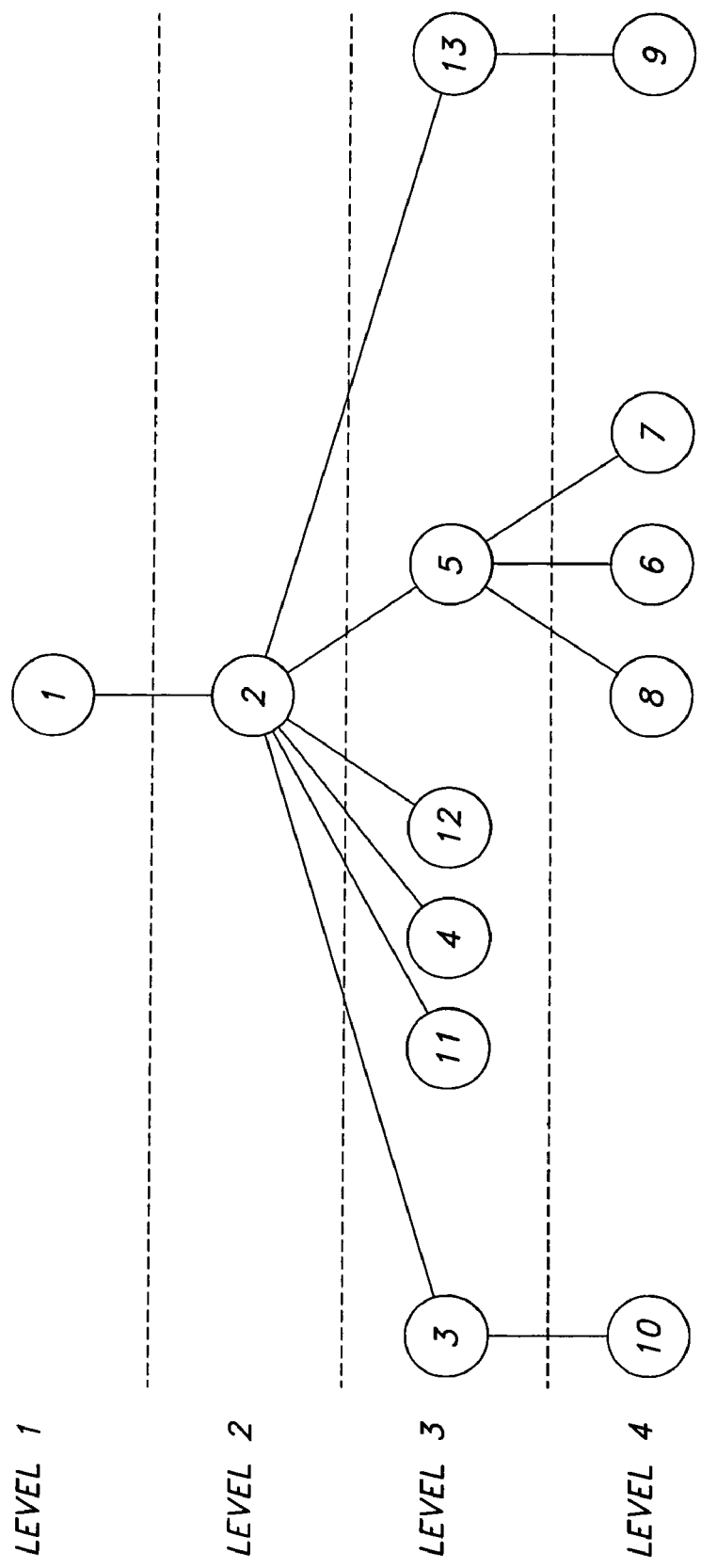
FIG. 10 is a graphical illustration of containment levels and nodes, according to one embodiment of the present invention.

5.4.3. Containment Levels. After the validation step 320 has re-ordered the records of table 141.1, the new hierarchical arrangement of the records may be illustrated as shown in FIG. 10. The Node numbers in FIG. 10 are distributed according to the level of specificity displayed in the data. For example, Level 1 in FIG. 10 includes Node 1, which represents the record including the address range "440-498 First Street." Of all the records shown in FIG. 9, the record located at Node 1 is the most general and thus is placed in Level 1. The next level of specificity, Level 2, includes Node 2. The record at Node 2 includes a single street address (440 First Street) but no secondary artifacts (no suite number).

Level 3 in FIG. 10 includes those addresses with suite numbers or ranges, but no consignee name. These records include Nodes 3, 11, 4, 12, 5, and 13. The nodes in Level 3 are arranged from left to right in order of the increasing suite number. In this aspect, the system 10 may be configured to order the address data from left to right in addition to placing them in different levels of specificity.

Level 4 includes those records having a name in the consignee field.

The concepts of containment and inclusion are demonstrated by the connections between the various nodes in FIG. 10. Node 10 is connected to Node 3 because "Suite 310" is a subset of the range "Suite 100-400." Similarly, Nodes 6, 7, and 8 are connected to Node 5 because their suite numbers "500 and 600" are a subset of the range in Node 5 (Suite 500-600). Finally, Node 9 is a subset of Node 13 because the address is the same, but Node 9 includes a consignee name.

The nodes as shown in FIG. 10 illustrate the containment and inclusion concepts that may be enforced in one embodiment of the validation step 320 of the present invention. Node 1 on Level 1 "contains" all the nodes below it, because all the other address records fall within the range stated for Node 1. Conversely, all the nodes below Level 1 are "included" within (or contained by) Node 1. Similarly, Node 2 on Level 2 contains all the nodes below it, and Node 3 contains Node 10. Node 5 contains Nodes 8, 6, and 7 because they are subsets of the range stated in Node 4. Node 13 contains Node 9.

In one embodiment, the validation step 320 of the present invention may assign a token to each unique record. The tokens also demonstrate the concepts of containment and inclusion. FIG. 11 is a tabular representation of the hierarchy table illustrated in FIG. 10. The table in FIG. 11 shows all the nodes and tokens at each level, beginning with Level 1. The token T1 can be described as containing all the other tokens in the hierarchy table. Notice, however, the token numbers may be different from the node numbers. Token T3 contains token T9. Token T5 contains tokens T6 and T7. Notice that token T6 is used for both Nodes 6 and 7 because the addresses are equivalent.

The concepts of inclusion and containment can be readily seen in FIG. 11. For example, comparing the data at Node 3 and Node 10, the reader will notice that "Suite 310" in Node 10 lies between the range of suite numbers (100-400) stored in Node 3. This relationship demonstrates the inclusion and containment concepts that are also illustrated in FIG. 10.

In one embodiment, there is no limit on the number of containment levels that may be applied during the validation step 320 of the present invention. An address records may contain a large number of artifacts. A table may include a large number of records. Considering the vast number of records that may be included in a table, the hierarchical organization of records may be used to greatly increase the speed of accessing and analyzing the data. The containment levels and token numbers described for the thirteen nodes illustrated in FIGS. 14, 15, and 16 may be applied to millions of address records and ranges, in any one of the tables of an address superset 130. In the same way that preferred table 141.1 in FIG. 9 may be ordered according to hierarchy, the other tables 141, 142, 143 in the address superset 130 may also be organized using nodes and containment levels.

In addition to the re-arrangement of data using containment levels, each table may be transformed into a sparse matrix linked list, as described herein, to further increase the speed of processing.

5.4.3. Preferred Tokens. Referring again to the table 141.1 in FIG. 9, Nodes 6 and 7 were both given the identical token T6 because they represent the same physical location. Notice, the consignee names in Nodes 6 and 7 are "APC" and "AM POLLING CMTE," respectively. These alternative names for the addressee are consignee aliases. In other words, APC is an alias for AM POLLING CMTE. As discussed herein, such a consignee alias may be stored in one or more consignee alias tables 143 in address superset 130.

Similarly, street alias data may be stored in one or more street alias tables 142 of the address superset 130. The fields in a street alias table 142, for example, may be arranged as shown in FIG. 13. The example street alias table 142 in FIG. 13 includes the several street aliases for Sixth Avenue in New York City, which is also known as Avenue of the Americas. A street alias table 142 may include such a list in a format that is readily accessible when comparing street address records.

In one aspect of the present invention, the address database management system 10 may be instructed to mark one of the alias representations as the "preferred representation." Applying the various street aliases and consignee aliases to the data stored in the address data superset 130, one of the tokens T4081 (for example) may be marked as the preferred representation. As such the preferred token 70 may include a marker such as a "p" for preferred, such that the preferred token 70 may look like T4081p. The system 10 of the present invention may recognize that all address records with the token T4081 are equivalent. In one embodiment, identifying a preferred token 70 and marking it (T4081p, for example) may be helpful to ensure the preferred artifacts (marked T4081p) of a particular street address are always returned in response to a query.

In this aspect of the invention, a validation step 320 in one embodiment may be configured to arrange stored data into new hierarchical data structures using queries. One or more tokens may be marked or otherwise identified as a preferred token 70 in one embodiment in order to identify the preferred representation of an address or a particular artifact.

In a related aspect, the management system of the present invention may be configured to pass tokens (instead of text) among various components of the system 10 of the present invention. Exchanging tokens may be more efficient and less prone to errors than exchanging long strings of address text. In this aspect, the use of tokens as unique identifiers further speeds the processing of queries, reporting, and other types of analysis on data stored in a superset.

In one embodiment, the validation step 320 may be executed as part of a suite of programs 500 of the address management system 110 (see FIG. 7, for example). The validation step 320 may be performed on a duplicate superset 330 and results released to the AMS client 655. In an address management system 110 applying one or more of the techniques described herein, the elapsed time from the capture step 300 to the release step 395 may be in the range of one hundred to two hundred milliseconds.

5.4.5. Comparing. The validation step 320 in one embodiment generally includes comparing a subjective representation 80 to the values stored in tables in the superset 30 and thereby searching for a preferred representation 90. In the context of an address management system 110, address validation 320 generally involves comparing the subjective representation 80 of an input address to the values stored in address databases 131, 132, 133 in an address superset 130 (as shown in FIG. 1), and identifying the preferred representation 90 for the address.

Figure 12:
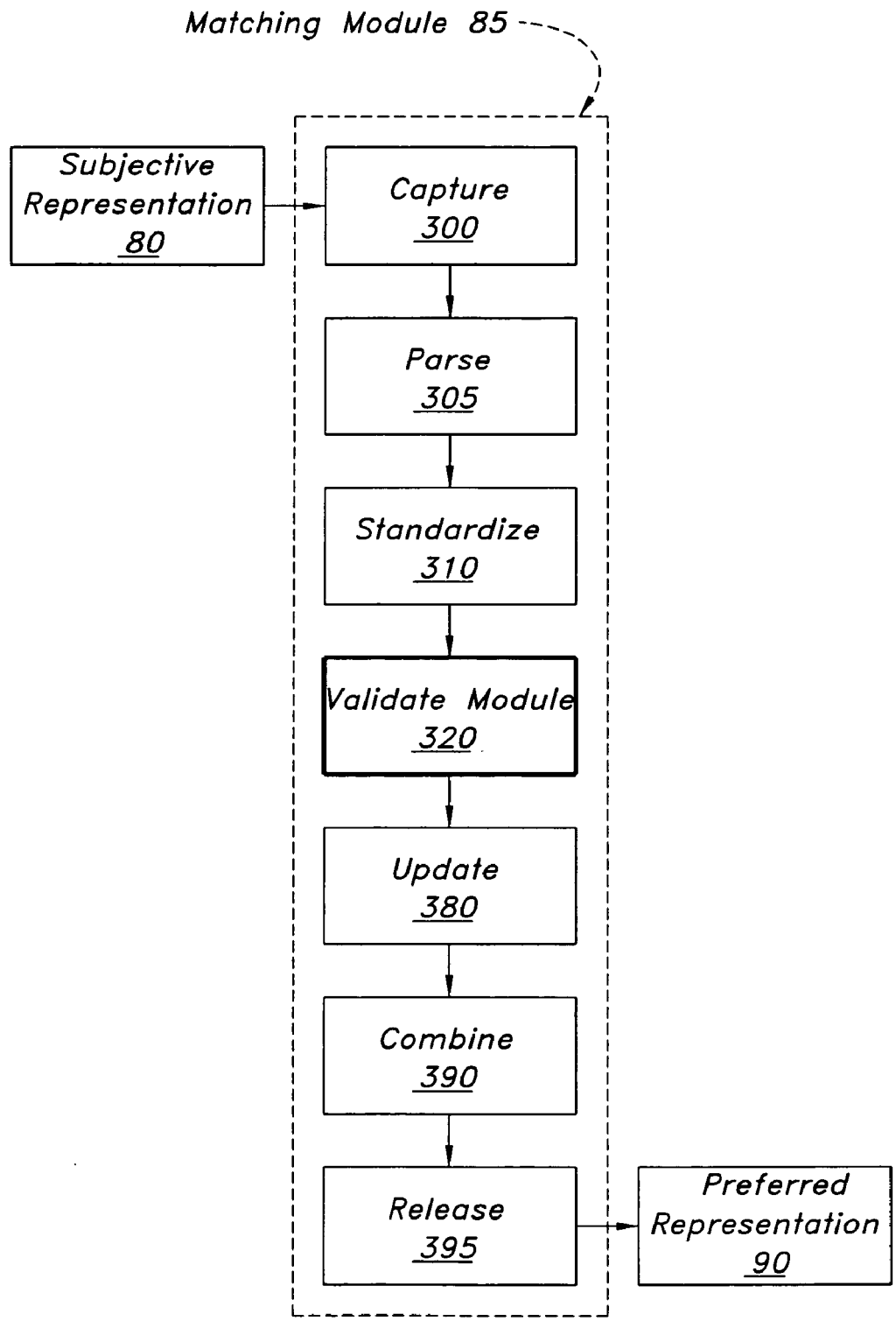
FIG. 12 is a flow chart of a matching module according to one embodiment of the present invention.

In the block diagram shown in FIG. 12, the validation step 320 occupies a single block. As described herein, however, the validation step 320 may involve a large number of steps and procedures for validating an address. The preceding sections have outlined a number of data manipulation routines and searching methods, while the process of comparing the input data to the stored data is described generally. More specifically, the comparing process of the validation step 320 in one embodiment may include the numbered steps listed below.

(1) Store the input data (subjective representations 80) in the plan database 134, in preferred table 141.4 (refer to FIG. 1).
(2) Compare the input data stored in preferred table 141.4 to the data values stored in the other preferred tables

141.1, 141.2, and 141.3 (if any). Recall, in one embodiment, each table in the superset may have been transformed into a sparse matrix linked list, re-arranged using nodes and hierarchical containment levels, and/or tokenized as described above, to facilitate fast and efficient searching in each table. The process of comparing may including locating one or more candidate representations from among the data values stored in the other preferred tables 141.1, 141.2, 141.3. Finding a match may include, in general, selecting the candidate representation having the closest resemblance to the selective representation 80 being searched.

(a) If a match is found between the input data and the preferred table data, then locate the corresponding preferred token 70 and proceed to execute the update 380, combine 390, and release 395 steps shown in FIG. 12.

(b) If no match is found, proceed to step (3) below.

(3) Compare the street name input data stored in preferred table 141.4 to the street alias data values stored in the street alias tables 142.1, 142.2, and 142.3. The process of comparing may including locating one or more candidate street aliases from among the data values stored in the street alias tables 141.2, 142.2, 142.3. Finding a match may include, in general, selecting the candidate street alias most closely associated with a preferred token.

(a) If a match is found between the street name input data and the street alias table data, then locate the preferred token 70 identifying the preferred street alias, substitute the corresponding street alias for the street name in the preferred table 141.4, and using the street alias repeat step (1) above.

(b) If no match is found, proceed to step (4) below.

(4) Compare the consignee name input data stored in preferred table 141.4 to the consignee alias data values stored in the consignee alias tables 143.1 (if any), 143.2, and 143.3. The process of comparing may including locating one or more candidate consignee aliases from among the data values stored in the consignee alias tables 143.1, 143.2, 143.3. Finding a match may include, in general, selecting the candidate consignee alias most closely associated with a preferred token.

(a) If a match is found between the consignee name input data and the consignee alias table data, then locate the preferred token 70 identifying the preferred consignee alias, substitute the corresponding consignee alias for the consignee name in the preferred table 141.4, and using the consignee alias repeat step (1) above.

(b) If no match is found, proceed to step (5).

(5). Return an exception code 400 to the user 28 or application.

(6) In one embodiment, the validation step 320 may include the step of displaying a list of possible matches (addresses, street aliases, consignee aliases) and permitting the user 28 to execute a visual comparison and manually select (if appropriate) one of the possible matches as the preferred representation.

(a) If a manual selection is made, the comparing process would proceed to execute the update 380, combine 390, and release 395 steps shown in FIG. 12.

(b) If no manual selection is made, the input data and the exception code 400 may be transferred out of the validation system for further processing.

The method described in Step (2) above, for finding a preferred address representation, may include the additional steps of (a) parsing the subjective representation into one or more discrete artifacts;

(b) selecting one of the one or more discrete artifacts:

(1) locating one or more candidate artifacts from among the source data by comparing the one discrete artifact to the source data;

(2) selecting a preferred artifact from among the one or more candidate artifacts, the preferred artifact having the closest resemblance to the one discrete artifact;

(3) storing the preferred artifact;

(c) repeating step (b) for each of the one or more discrete artifacts;

(d) combining the preferred artifacts to form a preferred representation.

Similarly, the method described in Steps (3) and (4) above, for finding a preferred alias representation, may include the additional steps of (a) parsing the subjective representation into one or more discrete artifacts;

(b) selecting one of the one or more discrete artifacts:

(1) locating one or more candidate alias artifacts from among the source data by comparing the one discrete artifact to the alias data;

(2) selecting a preferred alias artifact from among the one or more candidate alias artifacts, the preferred alias artifact being most closely associated with the preferred alias token;

(3) storing the preferred alias artifact;

(c) repeating step (b) for each of the one or more discrete artifacts;

(d) adding the preferred alias artifact to the preferred alias.

The term "match" as used in the comparing steps described above, in one embodiment, may involve an analysis of one or more artifacts of an address in order to determine whether the similarities between the data are sufficiently valid to constitute a "match." For example, the following guidelines may apply:

1. A literal match is required on the primary address, which includes the street number and the street name.

2. A literal match is only required on the secondary (such as a suite number) when the secondary exists in the Carrier Database 132 and it is associated with the primary address.

3. A literal match is only required on the consignee name when the consignee exists in the Plan Database 134 (the input data).

It should be understood that other matching guidelines may be established, depending upon the application and processing goals.

5.5. Interface

In one embodiment, the database management system, 110 of the present invention may include an interface 600 and a suite of programs 500, as shown in FIGS. 3 and 5-9. An interface 600 in one embodiment may be a computer program designed to provide an operative connection or interface between an application (such as a suite of programs 500) and a user (or another application). An interface 600 may provide a series of commands that allow a user to create, read, update, and delete the data values stored in the database tables. These functions (create, read, update, delete) are sometimes referred using the acronym CRUD, so an interface providing those commands may be called a CRUD interface. A database interface that includes a query function may be called a CRUDQ interface.

In one embodiment, the interface 600 may be configured as a COM-based interface; meaning that it is based upon the Component Object Model. Component Object Model is an open software architecture that may facilitate interoperability between an interface 600 and various other components of the system 10 of the present invention. Although a COM-based interface 600 may be provided, other software models may be used to accomplish a desired functionality.

A query function may be included in an interface 600 according to one embodiment of the present invention. A query is a command or instruction used extract a desired set of data from a database. The best known query language is Structured Query Language (SQL, pronounced "sequel"), although other query languages may be used. A query may include a single command or a complex series of commands. SQL includes a wide variety of query commands. Sets of query commands that may be used again can be saved in SQL as a stored procedure. Like running a program, calling a stored procedure in-sequel is more efficient than sending individual query commands one at a time. Also, stored procedures are generally compiled ahead of time and may also be cached by the database management system. In this aspect, query commands may be used as a powerful programming tool.

5.5.1. Application Identifier. The interface 600 in one embodiment may be configured to operate and interact with a variety of different programs and application, both internal and external to the database management system, 110 in use. The interface 600 may be configured to operate with each component of the internal suite of programs 500. The interface 600 may also be configured to operate with one ore more external programs or applications, outside the database management system, such as related database applications, auxiliary reporting applications, stand-alone business applications, or nay of a variety of other programs that may have a desire or a business need to interact with the data stored in the superset 30, 130.

In one embodiment, the interface 600 of the present invention may include one or more application identifiers, each having a corresponding rule set. The application identifier may be used to identify the application seeking access to the database management system of the present invention. The application identifier may be a single command or a complex algorithm. In general, the application identifier operates to identify an application seeking to interact with the database.

Each application identifier may include a corresponding rule set that may be used to govern the interaction between a specific application 270 and the database management system. Such interactions may include query requests, subscription updates, data transfer or other communications, output format instructions, or any other conduct. The application identifiers and rule sets may be stored in a database or otherwise saved in an accessible format.

In the context of an address management system 110, for example, a specific application 270 may seek access to the address superset 130 by sending a query. In response, an interface 600 may be configured to identify the application 270, retrieve the appropriate application identifier, and in turn retrieve the corresponding rule set. The interface 600 may then pass the rule set to the address management system 110 for use in processing the query or other interaction with the application 270. The address management system 110 may process queries or take other actions related to the application 270 which produce output data. The output data may be returned to the interface 600, where the rule set may be used to confirm the output data is in a format accessible by the application 270. In this aspect, the address management system 110 and its interface 600 may cooperate in processing requests from applications 270 by using the rule set.

In this aspect, the interface 600 of the present invention is generic; meaning the interface 600 may be configured to operate and interact with any application 270.

By maintaining a rule set separate from the interface itself, the programming in the interface 600 need not include rules for all the various applications 270. Instead, by using an application identifier, the interface 600 may include only relatively simple commands for finding and retrieving the corresponding rule set.

When the management system 110 requires interaction with a new application 270, there may be no need to modify the interface 600. The only action required may be to add an application identifier and a corresponding rule set for the new application 270. The interface 600 may provide a system for entering such new information.

5.5.2. Depth of Data Capture. The rule set for a particular application 270 in one embodiment may be configured to control which particular artifacts to capture from a data superset 30. In use, for example, a first application may require only ZIP code data, while a second application may require ZIP+4, City, and State. The rule set of the present invention may include stored information about the data requirements for the particular application 270 in use. By controlling the extent or depth of the data capture, the rule set may increase the efficiency and speed at which the interface 600 accesses data within the system 10.

6. CONCLUSION

The described embodiments of the invention are intended to be merely exemplary. Numerous variations and modifications will be apparent to those skilled in the art. All such variations and modifications are intended to fall within the scope of the present invention as defined in the appended claims.

What has been described above includes several examples. It is, of course, not possible to describe every conceivable combination of components or methodologies for purposes of describing the systems, methods, computer readable media and so on employed in database management systems. However, one of ordinary skill in the art may recognize that further combinations and permutations are possible. Accordingly, this application is intended to embrace alterations, modifications, and variations that fall within the scope of the appended claims. Furthermore, the preceding description is not meant to limit the scope of the invention. Rather, the scope of the invention is to be determined only by the appended claims and their equivalents.

While the systems, methods, and apparatuses herein have been illustrated by describing examples, and while the examples have been described in considerable detail, it is not the intention of the applicants to restrict or in any way limit the scope of the appended claims to such detail. Additional advantages and modifications will be readily apparent to those skilled in the art. Therefore, the invention, in its broader aspects, is not limited to the specific details, the representative systems and methods, or illustrative examples shown and described. Accordingly, departures may be made from such details without departing from the spirit or scope of the applicant's general inventive concepts.

What is claimed is:

1. An address management system for converting a subjective representation of an address into a preferred representation of the address, comprising:
a plurality of relational databases comprising:
a first relational database comprising one or more first tables;
a second relational database comprising one or more second tables for storing source data comprising address records as a sparse matrix linked list; and
a third relational database comprising one or more third tables storing standardized representations for a plurality of discrete artifacts;
an interface; and
a computer program module configured to:
receive a subjective representation of the address from said first relational database, wherein said subjective representation of the address comprises a plurality of discrete artifacts;
re-format the subjective representation of the address according to a set of standardization rules, wherein said standardization rules at least comprise amending punctuation in said subjective representation of the address;
parse said subjective representation of the address into the plurality of discrete artifacts, including name, street address, city, state, and zip code;
locate one or more candidate representations of the address;
select a preferred representation of the address from among said one or more of candidate representations of the address;
store said preferred representation of the address in said third relational database; and,
communicate the preferred representation of the address to the interface.

2. The address management system of claim 1, wherein said one or more second tables comprises a plurality of address records, and wherein said computer program module is further configured to arrange said address records in hierarchical order based upon the values of said data stored in said address records.

3. The address management system of claim 1, further comprising a local server computer and one or more client computers wherein said computer program module is further configured to distribute a duplicate of said source data comprising address records as a sparse matrix linked list from said local server computer to said one or more client computers.

4. The address management system of claim 1, wherein said computer program module, configured to locate one or more candidate representations of the address, is further configured to:
select one of said plurality of discrete artifacts in an address record;
locate one or more candidate artifacts from among said source data by comparing said one of said plurality of discrete artifacts to said source data;
select a preferred artifact from among said one or more candidate artifacts; and
combine said preferred artifact with one or more preferred artifacts to form one of said one or more candidate representations of the address.

5. The address management system of claim 1, wherein said computer program module is further configured to:
review alias data to identify a preferred alias representation of the address; and,
record a preferred alias token to said preferred alias representation of the address.

6. The address management system of claim 5, wherein said computer program module configured to review alias data to identify a preferred alias representation of the address is further configured to:
(a) parse said subjective representation of the address into a plurality of discrete artifacts;
(b) select one of said plurality of discrete artifacts:
(1) locate one or more candidate alias artifacts from said source data by comparing said one of said plurality of discrete artifacts to said alias data;
(2) select a preferred alias artifact from said one or more candidate alias artifacts;
(3) store said preferred alias artifact in said third relational database;
(c) repeat step (b) for each discrete artifact in said plurality of discrete artifacts of said subjective representation of the address; and
(d) combine said preferred alias artifacts to form one of said one or more candidate representations.

7. The address management system of claim 1, wherein said computer program module is further configured to:
parse the subjective representation of the address into a plurality of discrete artifacts;
retrieve standardization data from said third relational database, said standardization data comprising one or more standardized representations for each discrete artifact in said plurality of discrete artifacts; and
retrieve alias data from a fourth relational database, said alias data comprising one or more equivalent representations of each respective artifact in said plurality of artifacts.

8. The address management system of claim 1, wherein the interface is configured to govern interaction between said computer program module and one or more external applications.

9. The address management system of claim 8, wherein said interface communicates with a printer.

10. The address management system of claim 8, wherein said interface communicates with a display device.

11. The address management system of claim 8, wherein said interface communicates with an application residing on a computer system.

12. A method of processing a subjective representation of an address to obtain a preferred representation of the address, said method comprising the steps of:
receiving the subjective representation of the address;
parsing said subjective representation of the address into a plurality of discrete artifacts, wherein at least one of said discrete artifacts comprises a street address;
re-formatting the subjective representation of the address according to a set of standardization rules, wherein said re-formatting comprises at least altering punctuation of the subjective representation of the address;
locating one or more candidate artifacts from source data received as a sparse matrix linked list by comparing said one discrete artifact to said source data;
selecting a preferred artifact from said one or more candidate artifacts; repeating the step of selecting a preferred artifact from said one or more candidate artifacts to generate a plurality of preferred artifacts;
combining said plurality of preferred artifacts to form a candidate representation of the address;
repeating the step of said combining said plurality of preferred artifacts to form a candidate representation of the address step to generate a plurality of candidate representations of the address;

selecting a preferred representation of the address from said plurality of candidate representations of the address based on the presence of a preferred token; and communicating said preferred representation of ate address to an interface.

13. A method of processing a subjective representation of an address to obtain a preferred representation of tile address, in an address management system comprising a plurality of relational databases including a first relational database comprising one or more first tables, a second relational database comprising one or more second tables, wherein each of said one or more second tables further comprises a plurality of records comprising source data and a third relational database comprising one or more third tables, said method comprising the steps of;

receiving a subjective representation of the address stored in said first relational database, said subjective representation of the address comprising a plurality of artifacts including a name, street address, city, state, and zip code;

re-formatting the subjective representation of the address according to a set of standardization rules;

arranging said plurality of records in hierarchical order based upon the values of said source data stored in said plurality of records;

transforming one or more of said second tables into a sparse matrix linked list;

locating one or more candidate representations of the address from source data stored in said second relational database by recognizing that a preferred token is present among any of said one or more candidate representations of the address;

selecting a preferred representation of the address from among said one or more candidate representations of the address based an file presence of the preferred token; and communicating said preferred representation of the address from said third relational database to an interface.

14. The method of claim 13, further comprising:
storing said one or more second tables as a sparse matrix linked list in said second relational database.

15. The method of claim 13, further comprising:
(a) parsing said subjective representation of the address into a plurality of discrete artifacts;
(b) selecting one of said plurality of discrete artifacts:
  (1) locating one or more candidate artifacts from among said source data by comparing said one of said plurality of discrete artifacts to said source data;
  (2) selecting a preferred artifact from among said plurality of candidate artifacts;
(c) repeating step (b) for each of said plurality of discrete artifacts; and (d) combining the plurality of preferred artifacts to form one of said one or more candidate representations of the address.

16. The method of claim 13, further comprising:
reading standardization data from the third relational databases, said standardization data comprising one or more standardized representations of said plurality of discrete artifacts.

17. The method of claim 13, further comprising:
(a) parsing said subjective representation of the address into the plurality of discrete artifacts;
(b) selecting one of said plurality of discrete artifacts:
  (1) locating one or more candidate alias artifacts from among said source data by comparing said one of the plurality of discrete artifacts to said alias data;
  (2) selecting a preferred alias artifact from among said one or more candidate alias artifacts;
(c) repeating step (b) for each of said one or more discrete artifacts to generate a plurality of selected preferred alias artifacts; and
(d) combining said plurality of selected preferred alias artifacts to form one of said one or more candidate representations of the address.

18. The method of claim 13, further comprising the steps of:
presenting said one or more candidate representations of the address to a user; and
receiving an indication from the user identifying one of the one or more candidate representations of the address as the preferred representation of the address.

19. The method of claim 13, further comprising:
parsing said subjective representation of the address into a plurality of discrete artifacts;
reading standardization data in the third relational database, said standardization data comprising one or more standardized representations of said plurality of discrete artifacts; and
reading alias data in a fourth relational database, said alias data comprising one or more equivalent representations of said plurality of discrete artifacts.

20. The method of claim 13, said method further comprising:
reading a plurality of rule sets, each correlated to one of said one or more external applications;
receiving a request from a first external application;
retrieving a first rule set correlated to said first external application; and
applying said first rule set to govern the interaction between said first external application and said one or more computer program modules.

* * * * *

UNITED STATES PATENT AND TRADEMARK OFFICE
CERTIFICATE OF CORRECTION

PATENT NO. : 7,305,404 B2
APPLICATION NO. : 10/690322
DATED : December 4, 2007
INVENTOR(S) : Owens et al.

Page 1 of 1

It is certified that error appears in the above-identified patent and that said Letters Patent is hereby corrected as shown below:

Column 4,
Line 54, "modem" should read --modern--.

Column 6,
Line 65, "bet" should read --be--.

Column 11,
Line 26, "Gamer" should read --Garner-- and "Modem" should read --Modern--.

Column 12,
Line 10, "maybe" should read --may be--.

Column 33,
Line 6, "ate" should read --the--;
Line 9, "tile" should read --the--;
Line 37, "an file" should read --on the--.

Signed and Sealed this

Thirteenth Day of May, 2008

JON W. DUDAS
*Director of the United States Patent and Trademark Office*